United States Patent
Abaye et al.

(10) Patent No.: US 7,260,060 B1
(45) Date of Patent: Aug. 21, 2007

(54) CALL ADMISSION CONTROL

(75) Inventors: Alireza Abaye, Plano, TX (US); Wing Lo, Plano, TX (US); Moses Sun, College Station, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 09/577,292

(22) Filed: May 23, 2000

Related U.S. Application Data

(63) Continuation-in-part of application No. 09/370,984, filed on Aug. 20, 1999, now Pat. No. 6,798,786.

(60) Provisional application No. 60/137,877, filed on Jun. 7, 1997.

(51) Int. Cl.
*H04L 12/56* (2006.01)
(52) U.S. Cl. .................................................. 370/230
(58) Field of Classification Search ................. 370/230, 370/230.1, 231, 232, 233, 235, 236, 237, 370/252, 352, 353, 354, 355, 356, 389, 395.2, 370/395.21, 400, 401, 443, 493, 496
See application file for complete search history.

(56) References Cited

U.S. PATENT DOCUMENTS

| | | | |
|---|---|---|---|
| 5,115,429 A | 5/1992 | Hluchyj et al. | |
| 5,526,353 A | 6/1996 | Henley et al. | |
| 5,633,861 A | 5/1997 | Hanson et al. | |
| 5,793,976 A * | 8/1998 | Chen et al. | 370/252 |
| 5,828,666 A * | 10/1998 | Focsaneanu et al. | 370/389 |
| 5,870,561 A * | 2/1999 | Jarvis et al. | 709/238 |
| 5,881,051 A * | 3/1999 | Arrowood et al. | 370/248 |
| 5,883,891 A | 3/1999 | Williams et al. | |
| 5,889,774 A | 3/1999 | Mirashrafi et al. | |
| 5,907,610 A | 5/1999 | Onweller | |
| 5,953,322 A | 9/1999 | Kimball | |
| 6,046,678 A | 4/2000 | Wilk | |

(Continued)

FOREIGN PATENT DOCUMENTS

WO     WO99/23799     5/1999

OTHER PUBLICATIONS

The Applied Technologies Group, Wireless Enterprise Networking, The Technology Guide Series, 1-40 (1998).

(Continued)

*Primary Examiner*—Chi Pham
*Assistant Examiner*—Anh-Vu Ly

(57) ABSTRACT

A method and system of managing calls over a data network includes admitting a call if a throughput requirement is met. After a call request, the call request defining a throughput requirement, is received for establishing a call, a network resource responds with a throughput requirement request. A throughput measurement is performed between the destination terminals. A throughput measurement response, including the throughput measurement, is transmitted to the network resource. Further, a plurality of communities may be defined, each including one or more terminals. A call may be admitted between communities based on the throughput requirement being met in a connection between each respective terminal. Additionally, one or more of a plurality of resource elements may be selected in response to the call request based on the throughput requirement being met. The resource elements, which may include codecs (coders/decoders), packet sizes (for carrying audio data), and others, may be used in the requested call.

63 Claims, 12 Drawing Sheets

U.S. PATENT DOCUMENTS

| | | | |
|---|---|---|---|
| 6,069,890 A | | 5/2000 | White et al. |
| 6,084,955 A | * | 7/2000 | Key et al. .................. 370/233 |
| 6,163,807 A | * | 12/2000 | Hodgkinson et al. ....... 370/443 |
| 6,215,774 B1 | * | 4/2001 | Knauerhase et al. ........ 370/252 |
| 6,222,824 B1 | * | 4/2001 | Marin et al. ................ 370/230 |
| 6,222,829 B1 | | 4/2001 | Karlsson et al. |
| 6,262,974 B1 | * | 7/2001 | Chevalier et al. ........... 370/232 |
| 6,266,323 B1 | * | 7/2001 | Valko et al. ................ 370/230 |
| 6,356,545 B1 | * | 3/2002 | Vargo et al. ................ 370/355 |
| 6,373,835 B1 | | 4/2002 | Ng et al. |
| 6,404,738 B1 | * | 6/2002 | Reininger et al. .......... 370/236 |
| 6,426,942 B1 | | 7/2002 | Sienel et al. |
| 6,426,955 B1 | * | 7/2002 | Dalton et al. ............... 370/401 |
| 6,430,289 B1 | | 8/2002 | Liffick |
| 6,442,141 B1 | * | 8/2002 | Borella et al. .............. 370/248 |
| 6,463,044 B1 | | 10/2002 | Seo |
| 6,477,143 B1 | | 11/2002 | Ginossar |
| 6,487,170 B1 | * | 11/2002 | Chen et al. ................. 370/231 |
| 6,501,736 B1 | | 12/2002 | Smolik et al. |
| 6,515,964 B1 | * | 2/2003 | Cheung et al. ............. 370/230 |
| 6,515,973 B1 | * | 2/2003 | Young ........................ 370/329 |
| 6,519,249 B1 | * | 2/2003 | Bennefeld et al. .......... 370/352 |
| 6,529,499 B1 | * | 3/2003 | Doshi et al. ................ 370/352 |
| 6,538,993 B1 | * | 3/2003 | Itoh ........................... 370/230 |
| 6,556,565 B1 | * | 4/2003 | Ward et al. ................. 370/356 |
| 6,657,957 B1 | * | 12/2003 | Cheung et al. ............. 370/230 |
| 6,798,786 B1 | * | 9/2004 | Lo et al. ..................... 370/468 |
| 6,904,017 B1 | * | 6/2005 | Meempat et al. ........... 370/238 |
| 2002/0150054 A1 | * | 10/2002 | Sohraby et al. ............ 370/252 |
| 2003/0007622 A1 | * | 1/2003 | Kalmanek et al. .......... 379/219 |

OTHER PUBLICATIONS

Y. Bernet et al., A Framework for End-To-End QOS Combining RSVP/Intserv and Differentiated Services, Internet Engineering Task Force Internt Draft, pp. 1-15, (Mar. 1998).

R. Braden, et al., Resource Reservation Protocol (RSVP), Version 1 Functional Specification, pp. 1-62, Request for Comments 2205 (Sep. 1997). Databeam Corp., A Primer on the H-323 Series Standard, Version 2.0, pp. 1-21, printed.

Trillium Digital Systems, Inc., Trillium Quality of Service White Paper, pp. 1-37 (Apr. 17, 1998).

J. Toga, et al., Demystifying Multimedia Conferencing Over the Internet Using the H.323 Set of Standards, pp. 1-11, Intel Technology Journal (Second Quarter, 1998).

* cited by examiner

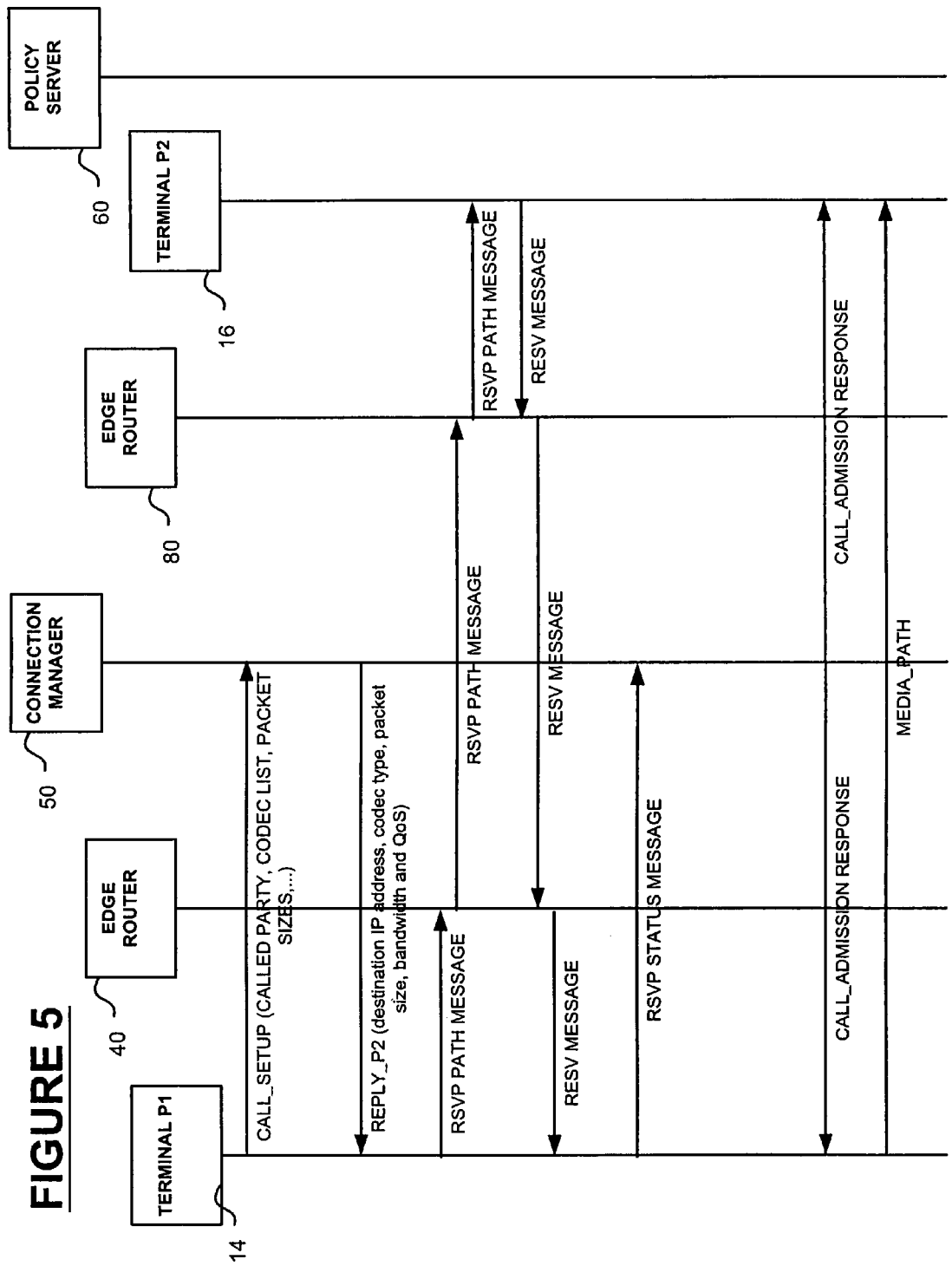

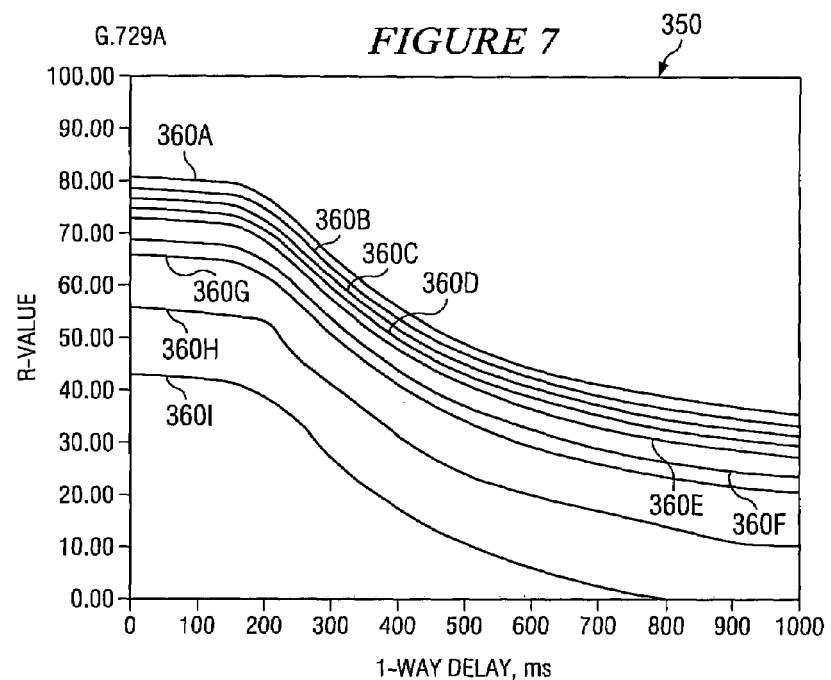
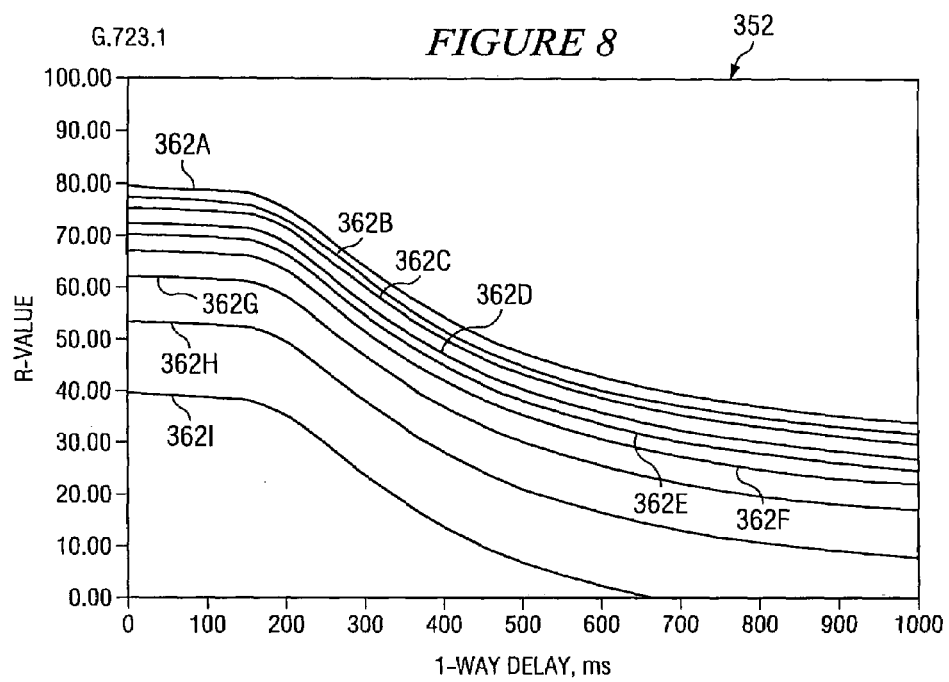

CALL ADMISSION CONTROL

This application is a continuation-in-part of U.S. patent application Ser. No. 09/370,984, filed Aug. 20, 1999 now U.S. Pat. No. 6,798,786, which claims priority under 35 U.S.C. §119(e) to U.S. provisional patent application Ser. No. 60/137,877 filed Jun. 7, 1997.

FIELD OF THE INVENTION

The invention relates to managing calls over a data network, such as an Internet Protocol (IP) network.

BACKGROUND OF THE INVENTION

Packet-based data networks are widely used to link various nodes, such as personal computers, servers, gateways, and so forth. Packet-based data networks include private networks, such as local area networks (LANs) and Wide Area Networks (WANs), and public networks, such as the Internet. The increased availability of such data networks has increased communication among nodes, whether the nodes are located in close proximity to each other (such as within an organization) or at far distances from each other. Popular forms of communications across such data networks include electronic mail, file transfer, network printing, web browsing, and other exchanges of digital data.

With the increased capacity and reliability of data networks, voice communications over both private and public data networks have become possible. Voice communications in a conventional public switch telephone network (PSTN) provides users with dedicated end-to-end circuit connections for the duration of each call. Unlike PSTN network, voice communications over data networks, such as IP (Internet Protocol) networks, has to compete the network bandwidth with other non-voice data (e.g. electronic mail, file transfer, web access, and other traffic). This makes the performance of voice data packets unpredictable if there is insufficient provision of quality of service.

In an IP network, each data packet is routed to a destination node based upon the destination IP address contained within the header of each packet. Each data packet may be routed over separate network paths before arriving at the final destination for processing. Transmission speeds of the various packets may vary widely depending on the conditions of the data paths over which the data packets are transferred. During peak usage of data networks, significant delays may be added to the transfer of voice data packets causing poor quality of voice communications. If there is insufficient provision of QoS in a congested network, voice data packets may be dropped in-transit to the destination due to inadequate or unavailable capacity of portions of data networks may result in gaps, silence, and clipping of audio at the receiving end.

A need thus exists for a method and system to improve the quality of voice calls or other audio communications over data networks.

SUMMARY

An aspect of managing the quality of telephony communications over a data network is call admission control according to the present invention. A call admission procedure consistent with the present invention determines whether to accept a call request from an originating terminal based upon the network condition. If a data network, or any portion of the data network, has become saturated with traffic (both audio and traditional data packet traffic), then according to the present invention, further call requests may be denied or rerouted to ensure some predetermined quality of service for the voice data packets.

According to one embodiment of the invention, call admission can only be granted if the throughput measurement response from a throughput measurement request matches or exceeds the throughput requirement of the call. An advantage of this embodiment's approach is that the network resources servicing the call are monitored while the call is set up or in progress to ensure an acceptable quality of service.

To establish a call between two or more terminals for performing telephony communications, according with this embodiment, a call request is sent from an originating terminal to the connection manager for processing. The call request may include the IP address of the originating terminal, an identifier of the destination terminal, a throughput requirement for the call, and optionally a list of one or more resource elements supported by the originating terminal to be used during an established call. Examples of resource elements include types of codecs (coders/decoders), the size of packets carrying audio data, and other resource elements.

Consistent with this embodiment, the call request defines a throughput requirement. References to the throughput requirement may include bandwidth requirements, supported resource element requirements, size of packet requirements, quality of service requirements, and the like. The call request need not take place only on call initiation to set up the call; it may also take place during a call reallocation phase, to select alternative resource elements while the call is in progress.

In yet another embodiment of the present invention, an originating terminal communicates with the connection manager over the data network for call control signaling (to set up and terminate a call). After a connection is established between terminals over the data network, the terminals directly communicate media traffic (voice or other audio) and optionally, media traffic signaling with each other through the data network.

The connection manager performs call setup processing, which includes translation of dialed digits (such as 10-digit telephone number) to an IP address of a destination terminal. The connection manager also keeps tracks of the status (e.g., busy, idle, down, and so forth) of the terminals that it is responsible for. In addition, the connection manager keeps track of the usage of the transmission facility (the data network and other transmission resources) by the telephony application.

BRIEF DESCRIPTION OF THE DRAWINGS

The invention will best be understood by reference to the following detailed description when read in conjunction with the accompanied drawings, wherein:

FIG. 5 illustrates the messages communicated between the various entities involved in call establishment according to a third embodiment of the invention;

FIGS. 7-8 illustrate E-models that map conditions of a network link to a desired quality of service in accordance with a fourth embodiment;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although the description refers to telephony communications over data networks, certain aspects of the methods and apparatus described may be advantageously used with other types of communications systems with different architecture.

Figure 1:
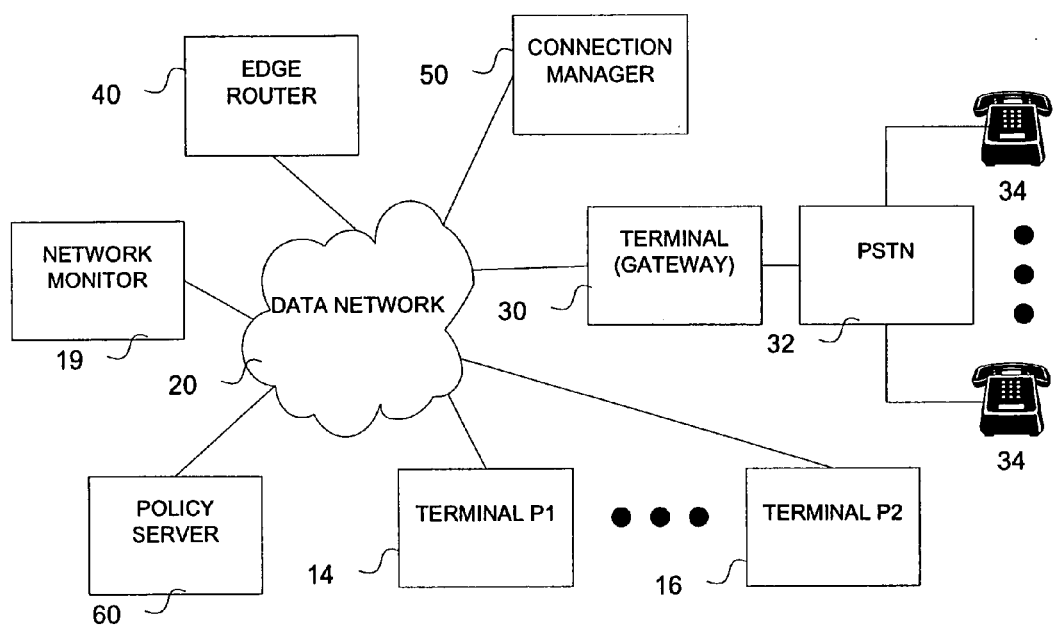
FIG. 1 is a block diagram of a first embodiment of a telephony communications system in which voice or other audio data may be communicated over packet-based data networks.
Figure 2:
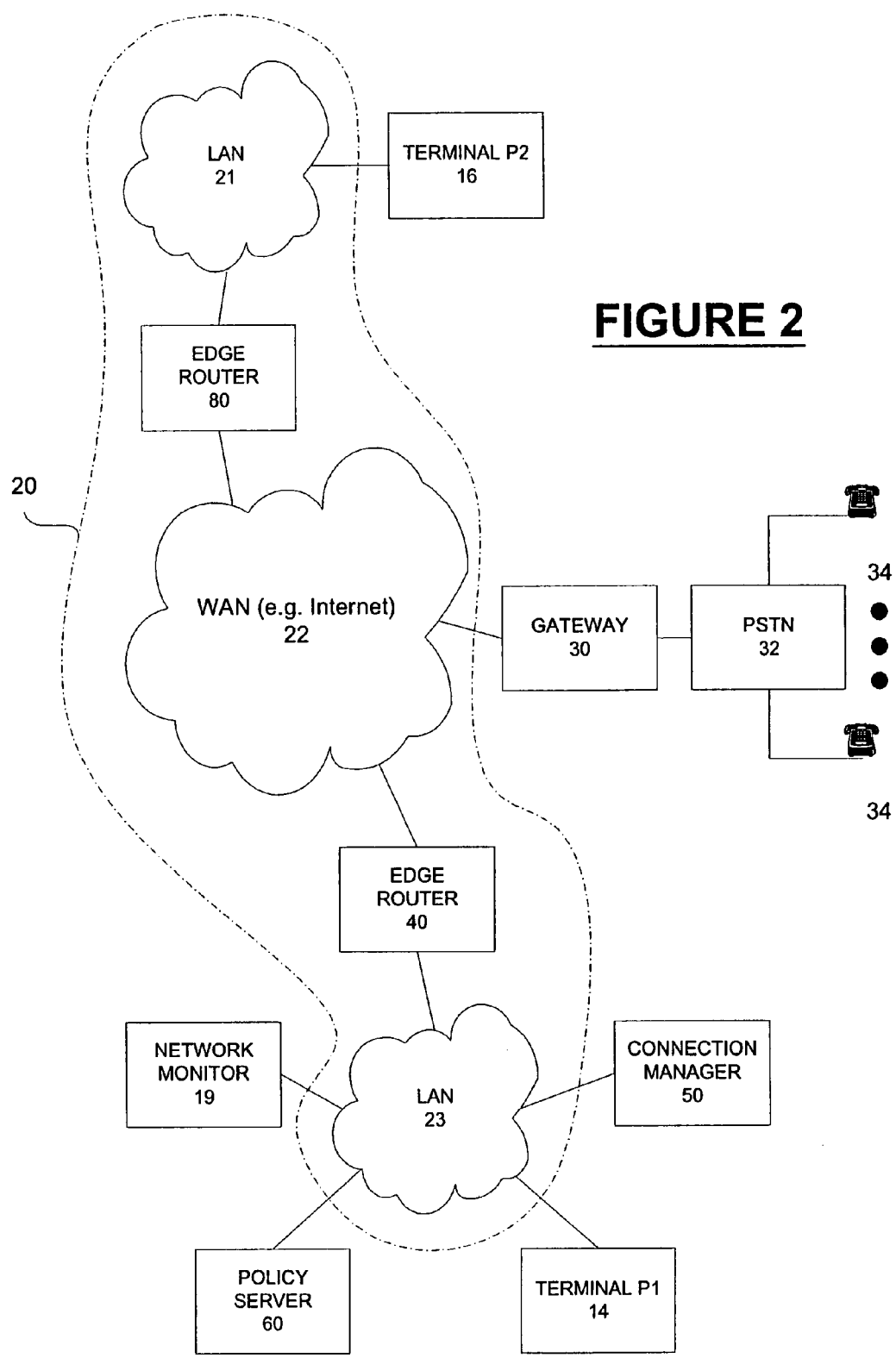
FIG. 2 is a block diagram of a second embodiment of a telephony communications system in which voice or other audio data may be communicated over packet-based data networks comprising communities (local area networks) connectively coupled via a wide area network.

Referring to FIGS. 1 and 2, a telephony communications system consistent with the present invention includes a number of endpoints or terminals (terminals 14, 16, 30 and 34 illustrated) that are capable of performing voice or other audio communications over a packet-based or message-based data network 20. As used here, "telephony communications" refers to the transmission and receipt of sounds (e.g., voice or other audio signals) between different points in a system using either wireline or wireless links. Example endpoints or terminals 14, 16, 30 and 34 may include computer systems with speech capability, telephone units that include interfaces to the data network 20, gateways coupled to standard telephones 34 though a public switched telephone network (PSTN) 32, and other types of communication devices. Telephony communications can occur between any two or more terminals over the data network 20.

The data network 20 may include, as examples, local area networks (LANs), metropolitan area networks (MANs), wide area networks (WANs), private networks such as Intranets and public networks such as the Internet, or a combination thereof. More generally, as used here, a data network is any communications link that utilizes message-based or packet-based transmission of data or signaling information. Data network 20 may communicate according to the Internet Protocol (IP), as described in Internet Engineering Task Force (IETF) Request for Comment (RFC) 791, entitled "Internet Protocol," dated September 1981. Data network 20 may include a single network or link or multiple networks or links that are coupled through gateways, routers, edge routers and the like, as shown more clearly in FIG. 2. Shown in FIG. 2 is local area network (LAN) network 21 communicatively coupled to LAN network 23 via edge router 80, wide area network 22 and edge router 40. LAN 21 may be considered as one community and LAN 23 may be considered as another community, as will be described in further detail herein.

A connection manager 50 is coupled to the data network 20 to manage telephony communications (e.g., call setup, processing, and termination) between or among the terminals 14, 16, and 30 (and other terminals shown or not shown in the figures). A policy server 60 may be queried by the connection manager 50 to determine the available bandwidth and other usage policy for telephony communications over the data network 20 to control the quality of service on the data network 20. Additionally, a network monitor system 19 may be coupled to the data network 20 to monitor certain characteristics and conditions of one or more portions of the data network 20. The characteristics and conditions monitored may include packet delay, jitter, and packet loss. Packet delay refers to a delay experienced in transmission due to processing, packetization, coding, decoding and queuing delays. Packet loss refers to the percentage loss of packets. Jitter refers to variations in the delay of a sequence of packets in the same stream of transmission. Jitter may contribute to end-to-end delay on a network because the receiving platforms need to buffer the received data packets to compensate the different delays of packets. Furthermore, jitter may also affect the packet loss.

An edge router 40 is accessible through data network 20. Edge router 40 connects local area network 23 to the IP backbone or an external data network such as a WAN 22. Edge router 40 runs routing protocols and computes routing tables to be used for forwarding IP packets. In addition, edge router 40 can also forward packets, do tunneling, authentication, filtering, packet accounting, traffic shaping and address translation. Consistent with the present invention, there may be more than one edge router on the edge of each community network.

Although only one connection manager, policy server and edge router are illustrated in each community, multiple connection managers, edge routers and policy servers may in fact be coupled to and operating the data network without detracting from the spirit of the invention. In this arrangement, each of the multiple connection managers may be responsible for managing call requests from a predetermined group of terminals, and each policy server may be responsible for maintaining usage policy and available bandwidth for different portions of the data network 20. Further, more than one network monitor 19 may be included in the telephony communications systems of a community. For example, multiple network monitors may be located to enable monitoring of characteristics and conditions of different portions of the data network 20. A connection manager, policy server, edge router and network monitor may be implemented as interdependent threads executing on separate processing platforms or in a processing platform including some or all of the aforementioned components.

To establish a call between two or more terminals for performing telephony communications, in the embodiments of FIGS. 1 and 2, a call request is sent from an originating terminal to the connection manager 50 for processing. The call request includes the IP address of the originating terminal P1, an identifier of the destination terminal, a throughput requirement for the call, and optionally a list of one or more resource elements supported by the originating terminal to be used during an established call. The identifier of the destination terminal is a unique identifier associated with the terminal, such as a telephone number, an IP address P2, an e-mail address, a URL, or any other unique identification code associated with the terminal. A terminal may be relatively busy at the time a call is desired. As a result, processing capability and storage capability in the originating terminal may be limited so that resource elements that require high bandwidth are not indicated as being supported. Examples of resource elements include codecs (coders/decoders), the size of packets carrying audio data, and other resource elements.

In the event that the unique identifier carried by the call request does not contain an IP address for the destination terminal, the unique identifier may be sent to connection manager 50, or any other network resource capable of performing the task, to look up a destination IP address P2 for the destination terminal. In the event that the destination terminal is not connected to an IP network, but to a PSTN, then the destination terminal that the call request is routed to is the PSTN gateway terminal 30. PSTN gateway terminal has an IP address associated with it and the call is routed using that associated IP address. The call request contains sufficient information concerning the destination terminal (e.g. a telephone number) for the PSTN to establish a call from PSTN terminal gateway, over the PSTN to the destination terminal.

The call request may define a throughput requirement. References to the throughput requirement may include bandwidth requirements, supported resource element requirements, size of packet requirements, quality of service requirements, and the like. With regard to the bandwidth requirements, throughput is the average number of user payload bits which traverse a telecommunication path over a period of time and is considered a measure of the effective data rate of a communications system. The call request need not take place only on call initiation to set up the call; it may also take place during a call reallocation phase, to select alternative resource elements while the call is in progress.

In the embodiments of FIGS. 1 and 2, an originating terminal 14 communicates with the connection manager 50 over the data network 20 for call control signaling (to set up and terminate a call). After a connection is established between terminals over the data network, the terminals communicate media traffic (e.g. voice, video or other audio), and optionally media traffic signaling, with each other through the data network 20. The connection manager 50 performs call setup processing, which includes translation of dialed digits (such as a 10-digit telephone number) to an IP address of a destination terminal. The connection manager 50 also keeps tracks of the status (e.g., busy, idle, down, and so forth) of the terminals that it is responsible for. In addition, the connection manager 50 keeps track of the usage of the transmission facility (the data network 20 and other transmission resources) by the telephony application. As used here, "telephony application" refers to one or more sessions of voice or other audio communications between or among the various terminals.

Optionally and in addition, by querying the policy server 60, the connection manager 50 may determine the available bandwidth of the data network links over which the call will be established and discards any resource elements that may be unsupportable. Further, the connection manager 50 may also query the network monitor 19 to determine the current characteristics and conditions of the network. Selection of resource elements may thus further be based on the current characteristics and conditions of the network (e.g., delays being experienced by packets and percentage of packet loss).

Next, consistent with these embodiments, the connection manager 50 ranks the remaining supportable resource elements based on predetermined merit attributes, which may include quality of service, the available bandwidth, expected usage of transmission resources, and other attributes. Selection of the resource elements to use for a particular call may in addition be based on the ranking performed by the connection manager 50.

An aspect of managing telephony communications over a data network in accordance with the present invention is call admission control. A call admission procedure determines whether to accept a call request from an originating terminal. If a data network, or any portion of the data network, has become saturated with traffic (both audio and traditional data packet traffic), then further call requests may be denied to ensure some predetermined quality of service is maintained for the existing active calls. Call admission may be granted if the throughput measurement response from a throughput measurement request matches or exceeds the throughput requirement of the call. This may rely upon a test signal propagating between network resources. Alternatively, or in addition, call admission may be based on usage of links between different groups of terminals (with the groups referred to as communities). Each community may include multiple terminals that are capable of communicating with each other without being subjected to call admission control. This is made possible by grouping terminals that are coupled to high capacity links, such as LANs. Thus, within each community, voice calls between terminals are allowed to proceed when requested. To provide some limitation on bandwidth usage of the communication link within each community, resource element selection (such as the codec and packet size selection described above) may be used to limit the bandwidth of each call session when large numbers of call sessions are present in the community. The call admission control may be provided for calls by using a throughput measurement response that satisfies the throughput measurement requirement and/or based on the monitored usage of the links among the communities.

Figure 6:
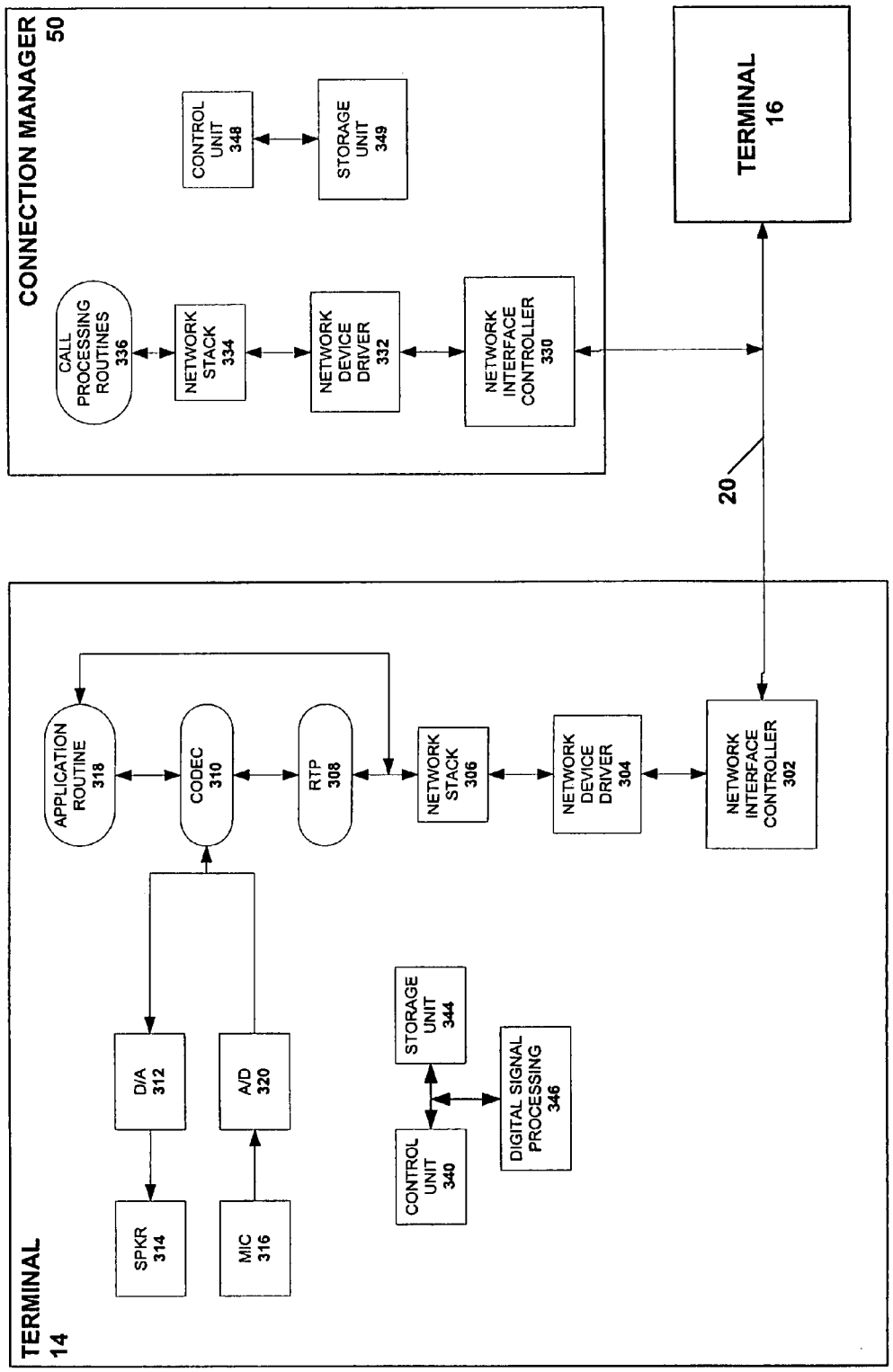
FIG. 6 illustrates components in a terminal and connection manager according to the first and second embodiments of the invention.

One type of resource element is the audio coder/decoder (codec), which may be used by each of the terminals involved in a call session. As shown in FIG. 6, an audio codec encodes audio signals originating from an audio input device (e.g., microphone) for transmission and decodes received audio data for output to an output device (e.g., a speaker). The codec may be implemented in software. Several types of codecs are available that have varying levels of data compression and data transfer rate requirements. For example, the G.711 codec provides uncompressed communications of voice data, but has a data transfer rate requirement of 64 kbps (kilobits per second). Other codecs, such as those conforming to the G.728, G.729A, G.729, G.723.1, and G.722 recommendations have varying compression algorithms and data transfer rate requirements, which are typically lower than that of the G.711 codec. The listed G series of audio codecs are recommendations from the International Telecommunications Union (ITU).

Generally, higher compression leads to a reduced amount of data so that data transfer rate requirements over a link may be reduced. However, because compression of data may cause loss of original voice fidelity, audio quality may be adversely affected. Thus, the two objectives of higher quality audio and lower data transfer rate requirements may conflict.

Conventionally, an originating terminal that desires to establish a voice communication with a destination terminal sends a list of supported codecs to the destination terminal. In response, the destination terminal chooses an acceptable codec from the list. Such a process is provided by the ITU H.323 protocol, which is a recommendation for packet-based multimedia. Although such a process allows voice communications employing a commonly supported codec between the originating and destination terminals, it does not take into account the capacity and usage of the link and other transmission resources between the terminals, in this case the data network 20, as well as other transmission or communications resources.

Another resource element is the packet size supported by the codec to communicate voice or other audio. A voice packet size refers to the duration of a speech sample that is contained in each packet. For example, a packet size may be 10 milliseconds (ms), which indicates that a 10-ms sample of speech is contained in each packet. Other packet sizes include 20 ms, 40 ms, and so forth. Selection of the packet size has implications on the burden placed on the data network in a given call session. Shorter packets generally are associated with higher overhead, since more audio data packets are communicated over the data network 20 between terminals. Longer packets are associated with reduced overhead, but come at the cost of longer delays at the originating station since a longer speech sample is created between successive transmissions of audio over the data network 20. Thus, selection of packet size may also lead to a conflict between the objectives of higher quality audio and reduced load on the data network 20 and other transmission resources.

A call admission control mechanism implemented in the terminals, connection manager(s), policy server(s), and/or network monitor(s) of the telephony communications system 10 balances the need for high audio quality as well as the need to reduce burden on the data network 20 and other transmission resources. The call control mechanism, by analyzing throughput of the communication path(s), may select a supported codec, packet size, and/or other resource element that takes into account support for the resource element by communicating terminals, the available capacity of the data network 20 and other transmission resources, and the objective to achieve the highest possible quality of service.

The present invention may be configured to comply with quality of service (QoS) protocols such as RSVP, Diffserv and also MPLS. It should be noted that these QoS protocols may be used in combination, for example, Diffserv may be used in combination with MPLS. FIG. 5 illustrates the flow for processing a call request between an originating terminal and a destination terminal in accordance with an RSVP enabled embodiment.

Different protocols exist that define packet-based call control signaling for call sessions over packet-based networks. One example call control protocol is a Session Initiation Protocol (SIP), which is used to initiate call sessions as well as to invite members to a session that may have been advertised by some other mechanism, such as electronic mail, news groups, web pages, and other mechanisms. SIP is part of the multimedia data and control architecture from the IETF. A version of SIP is described in RFC 2543, entitled "SIP: Session Initiation Protocol," dated 1999. The other protocols in the IETF multimedia and control architecture include the Resource Reservation Protocol (RSVP), as described briefly below and also in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast. Another signaling protocol that may be used includes MGCP as referred to in IETF document RFC 2705, entitled "Media Gateway Control Protocol" dated October 1999. MGCP is evolving to a new signaling protocol, which may also be used, called "Megaco", as referred to in ITU H.248.

The Resource Reservation Protocol (RSVP) is an Internet Engineering Task Force (IETF) standard designed to support resource (for example, bandwidth) reservations through networks of varying topologies and media. Through RSVP, a user's quality of service requests are propagated to all routers along the data path, allowing the network to reconfigure itself (at all network levels) to meet the desired level of service. The RSVP protocol reserves network resources by establishing flows throughout the network. A flow is a network path associated with one or more senders, one or more receivers and a certain quality of service. A sending host wishing to send data that requires a certain Quality of Service (QoS) will send, via an RSVP-enabled Service Provider, "path" messages toward the intended recipients. These path messages, which describe the bandwidth requirements and relevant traffic parameters of the data to be sent, are propagated to all intermediate routers along the path. A receiving host, interested in this particular data, will confirm the flow (and the network path) by sending "reserve" (RESV) messages through the network, describing the bandwidth characteristics of data it wishes to receive from the sender. As these reserve messages propagate back toward the sender, intermediate routers, based on bandwidth capacity, decide whether or not to accept the proposed reservation and commit resources. If an affirmative decision is made, the resources are committed and reserve messages are propagated backward on the previously traversed path from source to destination.

Diffserv relies on traffic conditioners sitting at the edge of the network to indicate each packet's requirements, and capability can be added via incremental firmware or software upgrades. An embodiment utilizing Diffserv, for example, takes the IP TOS (type of service) field, renames it the DS byte, and uses it to carry information about IP packet service requirements. Since it operates on Layer 3 of the OSI network model, it makes no assumptions about the underlying transport. Diffserv is suitable for serving a community, such as an enterprise network (e.g. LAN 23) at the point where customer traffic meets a service provider network (e.g. WAN 22), and because it specifies QOS at Layer 3 it can run without modification on any Layer 2 infrastructure that supports IP. Thus, Diffserv may be used in conjunction with MPLS. Further, traffic-engineered Diffserv may be used in conjunction with RSVP. Thus, routers in the WAN need not be concerned about bandwidth reservation for each call, which will be explained further later in this description.

Multiprotocol Label Switching (MPLS) is an evolving IETF standard intended for Internet application. MPLS is a method of speeding up IP-based data communication networks by routing at the edge and switching at the core. In other words, routers are used at the ingress and egress edges of the network, where their high levels of intelligence can be best used and where their inherent slowness can be tolerated. Switches are used in the core of the network, where they can take advantage of the intelligent switching labels provided by the routers, and where their inherent speed offers great advantage. MPLS enablement may be implemented as follows: As an IP data stream enters the edge of the network, the ingress router reads the full address of the first data packets and attaches a small "label" in the packet header, which precedes the packet. The switches in the core of the network examine the much-abbreviated label, and switch the packet with much greater speed than if they were forced to consult programmed routing tables associate with the full IP address. All subsequent packets in a data stream are automatically labeled in this fashion; and very quickly, as they have been anticipated. MPLS requires a network of sophisticated label-switching routers capable of reading header information and assigning packets to specific paths like virtual circuits on a switched network. MPLS specifies ways that Layer 3 traffic can be mapped to connection-oriented Layer 2 transports like ATM and frame relay; it adds a label containing specific routing information to each IP packet and allows routers to assign explicit paths to various classes of traffic. It also offers capabilities for traffic-engineering which can boost IP traffic efficiency by re-routing congested traffic over under-utilized links to alleviate network congestions. The ability to perform traffic-engineering using MPLS has the potential to improve the quality of network services when the traffic volume is very high.

Figure 3:
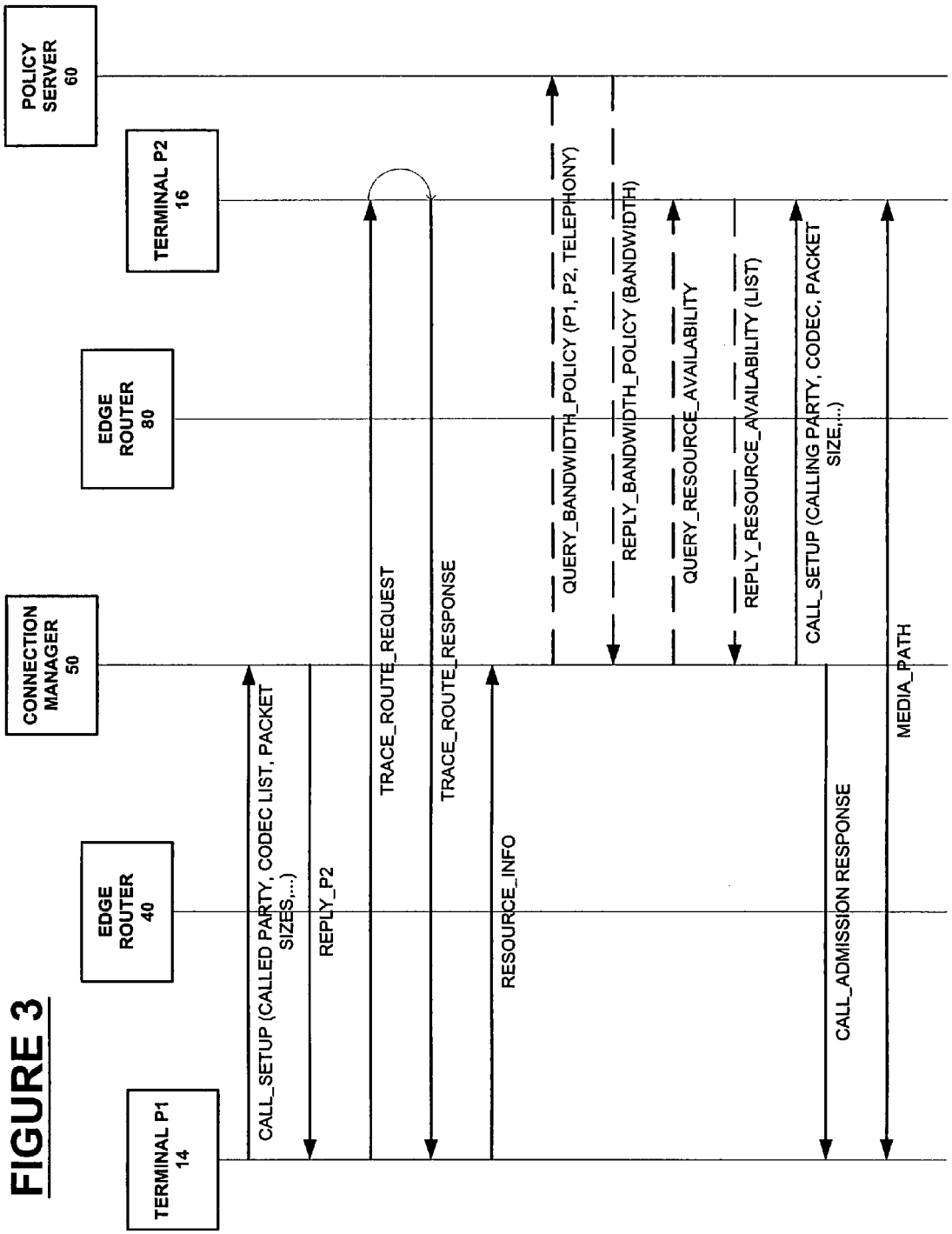
FIG. 3 illustrates the messages communicated between the various entities involved in call establishment according to the second embodiment of the invention.
Figure 4A:
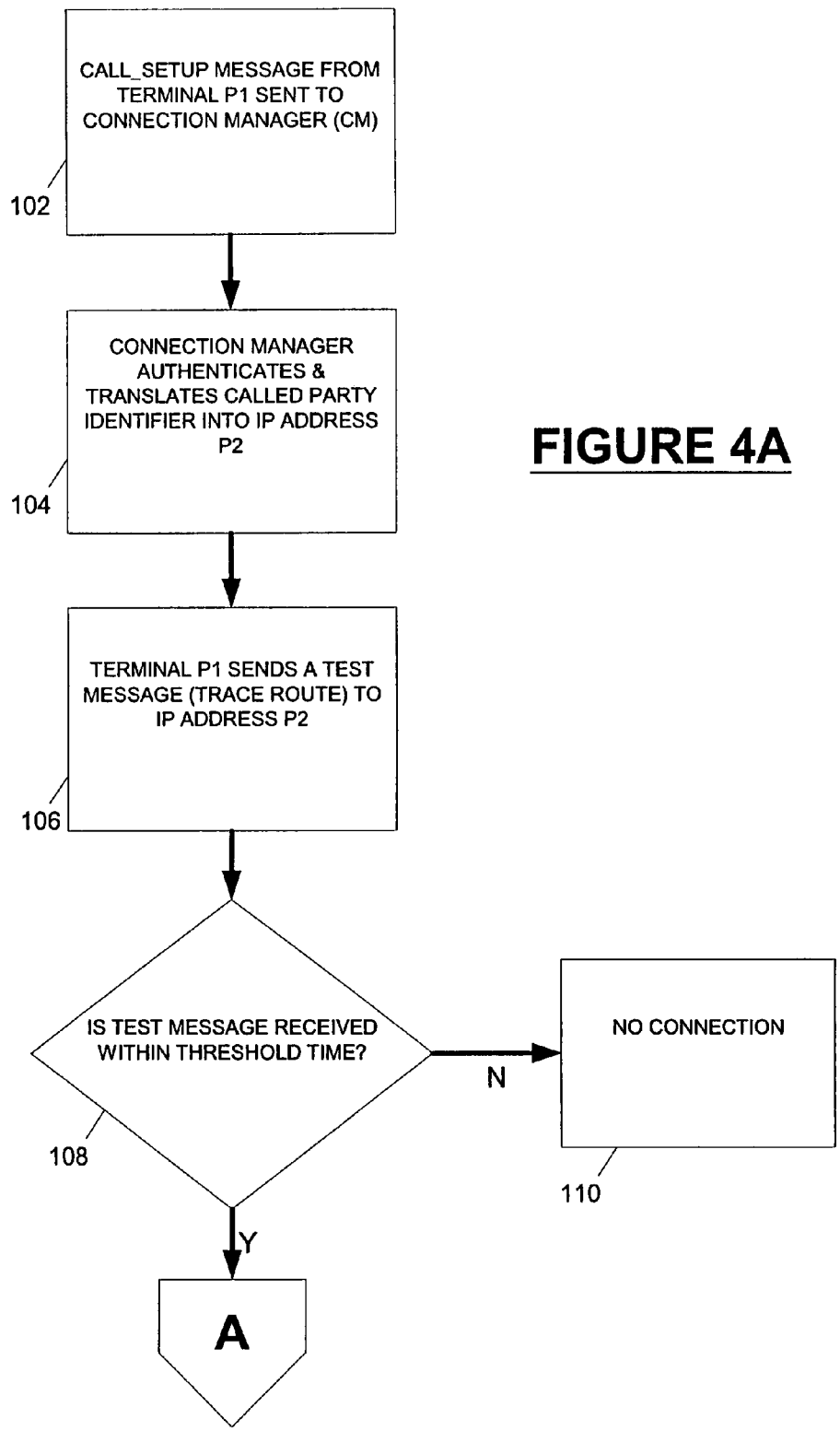
FIGS. 4A-4B illustrates the steps performed by the connection manager in the call establishment process.
Figure 4B:
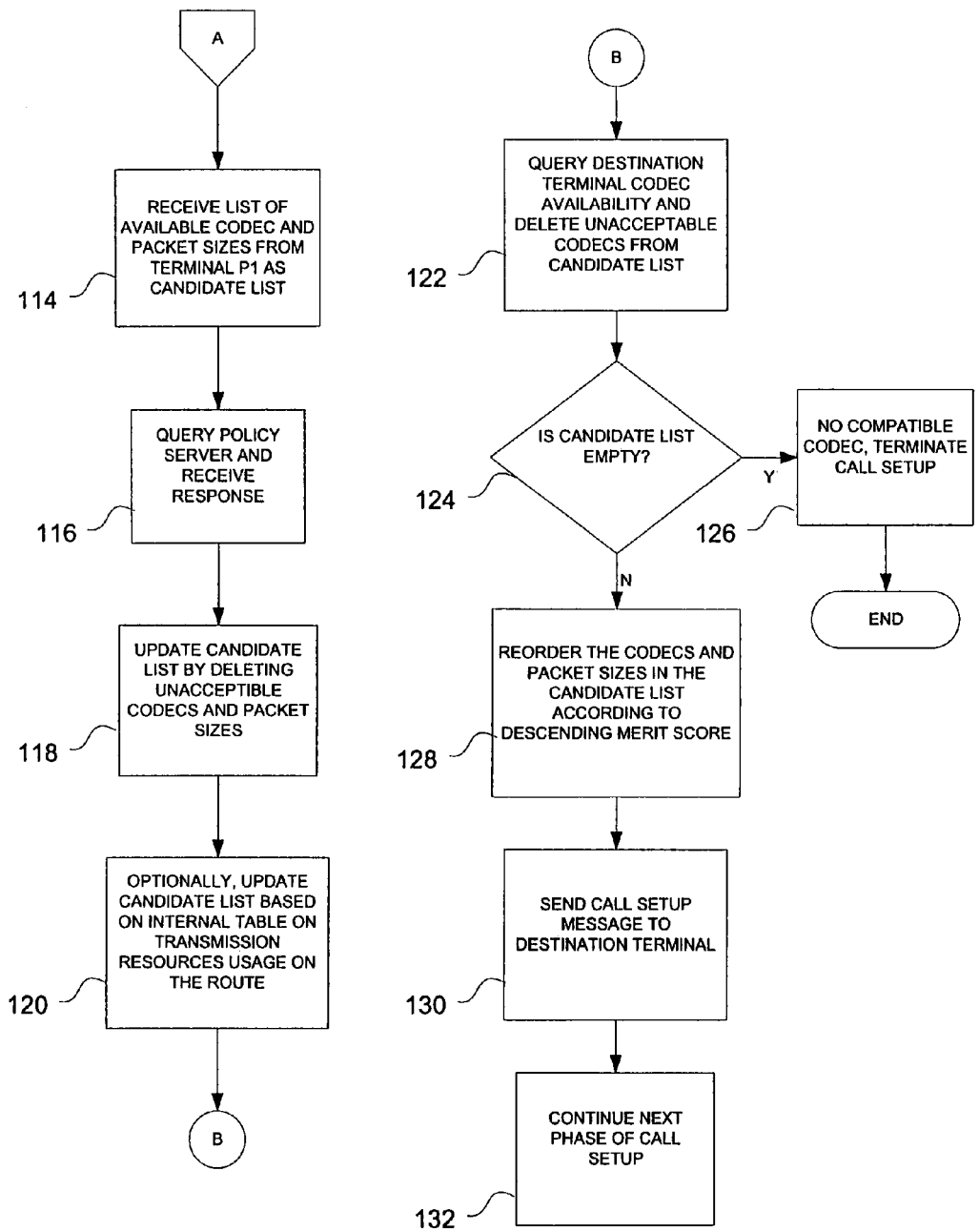

Referring to FIGS. 3 and 4A-4B, alternative processes for establishing a call between an originating terminal (e.g., the terminal 14, also referred to as terminal P1) and a destination terminal (e.g., the terminal 16, also referred to as terminal P2) shall now be discussed.

FIG. 3 illustrates the messages communicated between the various entities involved in call establishment according to a first embodiment, and FIGS. 4A-4B further illustrates the tasks performed by the connection manager 50 in the call establishment process according to the first embodiment.

To start a call, the originating terminal 14, which has an IP address P1, sends a call request, such as a CALL_SETUP message, which is received (at step 102 in FIG. 4A) by the connection manager 50. The CALL_SETUP message includes a number identifying the destination terminal, and optionally, a codec list including the codecs that are supported by the terminal 14, a list of supported packet sizes, and/or a list of other supported resource elements. Example codecs that are supported include G.711, G.728, G.729, G.729A, G.723.1, and G.722 codecs. The G.711 codec communicates uncompressed audio data and requires a 64-kbps data transfer rate, whereas the other codecs provide varying levels of data compression with lower data transfer rate requirements. For example, the G.728 codec requires a 16-kbps transfer rate, the G.729 codec requires an 8-kbps transfer rate, and the G.723.1 codec requires a transfer rate of 6.3 kbps, 5.3 kbps, or less.

In the connection manager 50, the list of available codecs and list of supported packet sizes in the CALL_SETUP message are received (at 114) and combined into a candidate list. Alternatively, the different lists of resource elements may be maintained as separate candidate lists. For example, the CALL_SETUP message sent to connection manager 50 may also send a list of available codecs and packet sizes from terminal 14 as a candidate list.

Based on the CALL_SETUP message, the connection manager 50 translates (at 104) the number (e.g., the dialed number) of the called party into an IP address (e.g., address P2 of the destination terminal 16). This is returned to originating terminal 14 as "REPLY_P2" as shown in FIG. 3, and it may include a throughput measurement request.

A throughput measurement request may comprise a trace route and/or a trace packet, or alternatively a request for a trace route and/or trace packet to be sent from a particular device. A Trace route may be used to build a list of the hops and network resources traversed from an originating network resource on a link to another network resource on data network 20. A list may be generated comprising the hops and the network resources that the trace route goes via. The listed network resources and the respective hops between resources may then be monitored for congestion. A trace route may propagate from terminal 14 with IP address P1 and terminal 16 with IP address P2 (at 106) to discover the full connection path between a network resource and another. TRACE_ROUTE_REQUEST may be sent from terminal 14 and may propagate via network resources on a connection path between terminal 14 and terminal 16. A TRACE_ROUTE_RESPONSE then propagates back from terminal 16 to terminal 14. It should be noted that TRACE_ROUTE_REQUEST may follow a different connection path to TRACE_ROUTE_RESPONSE.

A throughput measurement response such as a RESOURCE_INFO message may be sent from a network resource (e.g. originating terminal 14) to connection manager 50. Alternatively or additionally, a throughput measurement response may be provided from information obtained from the aforesaid trace packet, which may be used to provide RESOURCE_INFO messages directly or indirectly from each network resource on a connection path. The RESOURCE_INFO message may comprise the aforementioned list comprising the hops and/or the network resources that the trace route goes via. The list may change dynamically to include a different combination of network resources if it is necessary to reroute the call via other network resources for any reason.

Connection manager 50 then tests if the throughput measurement response meets a throughput measurement requirement. It may do this by monitoring the network resources in the resource list from the trace route. Thus, the connection manager 50 may maintain the QoS for the call by monitoring the network resources in the list for congestion and/or monitoring that the throughput measurement response remains to meet a throughput measurement requirement over the life of the call. A throughput measurement requirement may comprise performance thresholds such as time for a test packet to propagate from one network resource to another, available bandwidth, congestion, efficiency of communications link and other performance metrics. These performance metrics may be related to a service level agreement, as referred to later. If the throughput measurement response substantially meets this threshold, then the next phase of call setup may proceed.

If the throughput measurement response does not substantially meet the threshold then the connection request over the data network may be rejected (at 110). If this happens, an alternative resource may be used for the communications link, such as a switched network (e.g. PSTN), another data network, a connection-oriented network such as ATM or Frame Relay, a virtualized circuit or a dedicated private link. If a PSTN is used, the data packets may be packaged to travel over the PSTN and unpackaged to travel over the data network of the destination community. In such connection-oriented networks, packets are received in the same order in which they were transmitted.

Optional steps of policy service processing (as indicated by broken lines) may also be enacted, as a contingent method of providing QoS if a trace-route enabled QoS path is unable to be established, as represented on FIG. 3 by broken lines. Optionally, the connection manager 50 may send (at 116) a QUERY_BANDWIDTH_POLICY message to the policy server 60. The QUERY_BANDWIDTH- _POLICY message may include the IP addresses of the originating and destination terminals (P1, P2) and a request for the real time congestion status and linkage usage of appropriate edge routers which may serve originating and destination terminals (P1, P2). Optionally, also included in the message is a query for allowable bandwidth and other usage policy for a telephony application between the pair of terminals at the present time. The policy server 60 may also set the percentage of use for telephony communications and the percentage for traditional packet data communications.

Policy server 60 may contain call admission policy for connections between predetermined originating and destination terminals and/or between particular network resources. Such policy may be set by Service Level Agreements (SLAs). These are agreements between a user or a community and a service provider, defining the nature of the service provided and establishing a set of metrics to be used to measure the level of service provided measured against the agreed level of service. Typically, a SLA may be set up over a WAN to provide a predetermined quality of service between communities. Such service levels might include provisioning (e.g. quality of service), average availability, restoration times for outages, availability, average and maximum periods of outage, average and maximum response times, latency, delivery rates (e.g. average and minimum throughput). An SLA policy may, for example, agree to deliver 1% packet loss, with 5 ms average delay and 50 ms packet size.

The policy server 60 responds to the query by sending a REPLY_BANDWIDTH_POLICY message back to the connection manager 50 to indicate the real time congestion status and linkage usage of network resources which may serve terminals P1 and P2, and also optionally, the available bandwidth that may be allocated between the terminals P1 and P2 for the present call session. Based on the received allocated bandwidth, the connection manager 50 updates (at 118) the candidate list by deleting unacceptable codecs. The policy server 60 may allocate a reduced bandwidth for the telephony application because of high traffic carrying traditional data packets (e.g., e-mail traffic, web browsing traffic, file transfer traffic, and so forth). Thus, codecs that have high bandwidth requirements may be deleted (at 118) from the candidate list. Examples of such high bandwidth codecs include the G.711 codec. In addition, unacceptable packet sizes are also deleted by the connection manager 50 from the candidate list (at 118), depending on the available bandwidth. If a limited bandwidth is available, then shorter packet sizes may be deleted from the list by the connection manager 50. Thus, the connection manager 50 selects one or more resource elements (e.g., codecs and packet sizes) that are supported based on the available bandwidth of the data network 20.

Further alternatively or in addition, the connection manager 50 can also perform an additional bandwidth restriction based on the usage of transmission resources. Consistent with the present invention, each connection between a pair of terminals shares a pool of transmission resources (links coupling the terminals that the connection manager 50 is responsible for, edge routers, routers and gateways coupling the links, and other resources) with other applications. The connection manager 50 keeps track of the usage of the pool of transmission resources by tracking the number of voice calls and other traffic. When the usage reaches a predetermined threshold, the connection manager 50 may further limit the bandwidth usage. The connection manager 50 may use this limitation to further delete (at 120) unacceptable codecs, packet sizes, and other resource elements from the candidate list so that a further reduced number of resource elements may be selected.

The connection manager 50 may then send (at 122) a query message, e.g., a QUERY_RESOURCE_AVAILABILITY message, to the destination terminal P2 to identify the supported codecs, packet sizes, and other resource elements in the destination terminal P2.

The results are returned in a REPLY_RESOURCE_AVAILABILITY message, from which the connection manager 50 can determine the codecs, packet sizes, and other resource elements supported by the destination terminal P2. The candidate list of codecs, packet sizes, and other resource elements is updated within the connection manager 50 based on the available codecs in the destination terminal P2, with unsupported codecs, packet sizes, and other resource elements deleted from the candidate list.

Potentially, all codecs or packet sizes may have been deleted from the candidate list. If either the list of codecs or the list of packet sizes is empty (as determined at 124), then no supported codec or packet size exists to allow a call to proceed between the terminals P1 and P2, at which point the connection manager 50 sends (at 126) a message to terminate the call setup. The connection manager 50 may also inform the originating terminal P1 of the setup failure.

If at least one codec and at least one packet size is available in the candidate list, then the call may proceed. If two or more codecs are present in the candidate list, then the codecs are reordered (at 128) by applying a merit-based codec ranking algorithm to rank the codecs in the candidate list in the descending merit order (described further below). Packet sizes may also be ordered according to a merit ranking algorithm, as may other resource elements.

The codec, packet size, and other resource element having the highest relative rank is selected. Alternatively, selection may be performed by the terminals, which may be adapted to select the highest ranking resource elements from a list.

Next, assuming that resources are available, the connection manager 50 sends a CALL_SETUP message to the destination terminal P2 (at 130), with the Call Setup message including an identifier of the calling party (either the calling terminal's telephone number or its IP address), the selected codec, packet size, and other resource element. The connection manager 50 then proceeds (at 132) to the remaining tasks to be performed in the call setup, including sending a CALL_ADMISSION_RESPONSE message identifying the selected codec, packet size, and other resource element back to the originating terminal P1. Alternatively, the codec, packet size, and other resource element may be communicated as parameters in a Setup Connection message sent by the connection manager 50 to connect the call between terminals P1 and P2. A media path is then set up between the terminals P1 and P2.

Although reference is made to selection of several resource elements, it is contemplated that further embodiments may select fewer than all the possible types of resource elements in the call management process. For example, connection manager 50 may perform selection of only codecs to manage bandwidth usage and quality of service on the data network 20. In addition, if multiple connection managers are present in the data network 20, then communications may occur between connection managers 50 to enable selection of resource elements for establishing a call between terminals controlled by the connection managers.

FIG. 5 illustrates the messages communicated between the various entities involved in call establishment using Resource Reservation Protocol (RSVP) signaling. As explained above, RSVP is an IETF standard designed to support resource (for example, bandwidth) reservations through networks of varying topologies and media. Through RSVP, a user's quality of service requests are propagated to all routers along the data path, allowing the network to reconfigure itself (at all network levels) to meet the desired level of service. More information on RSVP may be found in RFC 2205, which is available at the IETF repository located at www.ietf.org.

To start a call, the originating terminal 14, which has an IP address P1, sends a call request, such as a CALL_SETUP message, which is received by the connection manager 50. The CALL_SETUP message includes a number identifying the destination terminal, and optionally, a codec list including the codecs that are supported by the terminal 14, a list of supported packet sizes, and/or a list of other supported resource elements.

In the connection manager 50, the list of available codecs and list of supported packet sizes in the CALL_SETUP message are received and may be combined into a candidate list. Alternatively, the different lists of resource elements may be maintained as separate candidate lists. A reader skilled in the art to which this invention pertains will appreciate that these steps may be performed in an alternative order to those described.

Based on the Call Setup message, the connection manager 50 translates the number (e.g., the dialed number) of the called party into an IP address (e.g., address P2 of the destination terminal 16). It may also send the recommended codec type and packet size which can be used for bandwidth information in addition to the IP address which is used by the RSVP PATH message.

Next, in accordance with FIG. 5, an RSVP 'PATH' signal may be sent from originating terminal 14 to network resources, such as but not limited to, edge router 40, edge router 80 and destination terminal 16. RSVP signaling to the various network resources may happen simultaneously or in a sequence. The RSVP protocol engages network resources by establishing flows throughout the network. A flow is a network path associated with one or more senders, one or more receivers and a certain quality of service. A sending host wishing to send data that requires a certain Quality of Service (QoS) will send, via an RSVP-enabled Service Provider, "path" messages toward the intended recipients. These path messages, which describe the bandwidth requirements and relevant parameters of the data to be sent, are propagated to all intermediate routers along the path. A receiving host, interested in this particular data, will confirm the flow (and the network path) by sending reserve (RESV) messages through the network, describing the bandwidth characteristics of data it wishes to receive from the sender. As these RESV messages propagate back toward the sender, intermediate routers, based on bandwidth capacity, decide whether or not to accept the proposed reservation and commit resources. If an affirmative decision is made, the resources are committed and RESV messages are propagated to the next hop on the path from source to destination.

In situations that an ATM, frame relay, or an engineered DiffServ core (WAN) network for communications between communities, it is preferred not to use RSVP in the core. In these scenarios, the RSVP messages still traverse the network end to end, but routers in the core will not examine RSVP messages and treat them like any other data packets. This process keeps RSVP benefits on calling and called party communities, and leaves the core network free of RSVP states overhead.

Since RSVP is unidirectional, terminal 16 may also establish RSVP-enabled communications by sending RSVP path messages in the opposite direction to the RSVP arrows shown. Although this has not been shown on FIG. 5, an RSVP-enabled communication path from terminal 16 to terminal 14 may be established in a similar fashion to that described for that set up from terminal 14 to terminal 16.

Next, an RSVP status message is sent from terminal 14 to connection manager 50 confirming that resources on the communications path have been reserved. Connection manager 50 then sends a call admission response to terminal 14 and terminal 16 to admit the call. A media path may then carry the media traffic.

Referring to FIG. 6, components of an example terminal and connection manager are illustrated. In FIG. 6, the components of the terminal 14 and connection manager 50 described above are illustrated in more detail. As noted above, the terminal 14 can be one of many types of devices capable of communicating voice over the data network 20. These terminals may include computer systems, telephones that are configured to communicate over a data network, a gateway system to the public switched telephone network (PSTN), and other communications devices. The layers of the terminal 14 include a network interface controller 302 that is coupled to the data network 20. Above the network interface controller 302 is a network device driver 304 and a network stack 306, such as a TCP/IP or UDP/IP stack. TCP stands for Transmission Control Protocol, and is described in IETF RFC 793, entitled "Transmission Control Protocol," dated September 1981. UDP stands for User Datagram Protocol, and is described in RFC 768, entitled "User Datagram Protocol," dated August 1980. Above the network stack 306 is a real time protocol (RTP) layer 308 that performs various tasks associated with real time communications such as telephony communications. Incoming data from the data network 20 is received through the layers 302, 304, 306 and 308 and routed to an audio codec 310, which has been selected from a number of available codecs as discussed above. The incoming data is decoded by the codec 310 and routed to a digital-to-analog (D/A) converter 312 to produce the output at a speaker 314. Outbound data to the network 20 originates at a microphone 316 or from an application routine 318. A user can speak into the microphone 316 to communicate voice data over the data network 20. Alternatively, the application routine 318 (or some other routine) may generate voice, video or other audio data to be transmitted to the data network 20. Examples of this may include an automated answering application, such as a voice mail application or a voice prompt application from which users can select to access to various services.

From the microphone, audio signals are passed through an analog-to-digital (A/D) converter 320, which digitizes the audio signals and passes the digital audio data to the codec 310. The codec 310 encodes the data and transmits the coded data down layers 308, 306, 304, and 302 to the data network 20. The audio traffic is communicated through the data network 20 to another terminal to which the terminal 14, 16, or 30 has established a call connection.

In addition to the audio traffic path, a control path exists between the terminal and the connection manager 50 to set up, maintain, and terminate voice calls over the data network 20. In the terminal 14 one or more application routines 318 may generate control messages that are transmitted to the connection manager 50 through the network stack 306, network device driver 304, network interface controller 302, and the data network 20. Control signaling from the connection manager 50 is similarly received through the same layers from the data network 20 back to the one or more application routines 318.

As shown in FIG. 6, in the connection manager 50, similar layers may exist. A network interface controller 330 in the connection manager 50 is coupled to the data network 20. Above the network interface controller 330 is a network device driver 332 and a network stack 334, such as a TCP/IP or UDP/IP stack. One or more call processing routines 336 in the connection manager 50 controls the management of calls between terminals that are assigned to the connection manager 50. The call processing routines 336 perform the establishment of calls, maintenance of calls, and termination of calls. The call processing routines 336 may also periodically determine the available bandwidth over the data network 20, which may cause it to update the codec and packet size used by the terminals in the voice communication session over the data network 20.

In each terminal and connection manager, various software routines or modules may exist, such as the one or more application routines 318, network stack 306, and device driver 304 in the (D/A) converter 312 to produce the output at a speaker 314. Outbound data to the network 20 originates at a microphone 316 or from an application routine 318. A user can speak into the microphone 316 to communicate voice data over the data network 20. Alternatively, the application routine 318 (or some other routine) may generate voice or other audio data to be transmitted to the data network 20. Examples of this may include an automated answering application, such as a voice mail application or a voice prompt application from which users can select to access to various services. From the microphone, audio signals are passed through an analog-to-digital (A/D) converter 320, which digitizes the audio signals and passes the digital audio data to the codec 310. The codec 310 encodes the data and transmits the coded data down layers 308, 306, 304, and 302 to the data network 20. The audio traffic is communicated through the data network 20 to another terminal to which the terminal 14 has established a call connection.

Various software routines or modules may exist, as shown in FIG. 6. Instructions of such software routines or modules, and others, may be stored in storage units 344 and 349. in the terminal and connection manager, respectively. The storage units 344 and 349 may include machine-readable storage media including memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital versatile discs (DVDs).

The instructions may be loaded and executed by control units 340 and 348 in the terminal and connection manager, respectively, to perform programmed acts. The control units 340 and 348 may include microprocessors, microcontrollers, application-specific integrated circuits (ASICs), programmable gate arrays (PGAs), or other control devices as is known in the art. The terminal 14 may also include a digital signal processor 346 for performing arithmetic intensive operations such as compression and decompression operations performed by the audio codec 310 as is known in the art.

The following discusses merit-based codec ranking. A modified ranking system may be provided for packet size and/or other resource element selection. The connection manager 50 maintains a table of characteristics of each codec including the following attributes: voice quality (Q), bandwidth usage (B), and terminal DSP (e.g., digital signal processor 346 in FIG. 9) resource usage (R). The Q, B, and R attributes may contain numeric values (ranging between 0 and 1). The attribute B in one embodiment may represent the inverse of the actual bandwidth usage, that is, a higher B value indicates low bandwidth usage and a low B value indicates high bandwidth usage. The attribute R similarly represents the inverse of the actual DSP usage. A merit factor M can be computed for each codec in the candidate list as a linear combination of the attributes Q, B, and R according to the following equation:

$$M = W_Q * Q + W_B * B + W_R * R,$$

where $W_Q$, $W_B$, and $W_R$ are weights that are assigned to the attributes Q, B, and R, respectively. The values of the weights $W_Q$, $W_B$, and $W_R$ may be dynamic and can be based on usage of the pool of transmission resources used for the telephony application. Thus, in one example, the values of the weights $W_Q$, $W_B$, and $W_R$ may be assigned as follows:

$$WQ = (1-t)*0.8, \ WB = t, \text{ and } WR = (1-t)*0.2$$

where t is the percentage usage of the pooled transmission resources for the telephony application. The codecs in the candidate list may be arranged in descending order of the merit factor M, from which a codec can be selected for use in the call to be established.

Thus, the merit factor M may be higher for codecs having relatively high audio quality (Q), low expected bandwidth (e.g., data transfer rate) usage (B), and low expected DSP usage (R). Codecs having relatively low audio quality, high expected bandwidth usage, and high DSP usage will have a lower M value. Thus, generally, the value of the merit factor M is increased with higher audio quality and decreased usage of transmission resources (e.g., links in the data network 20 and DSP 346).

As noted above, in connection with FIGS. 1 and 2, the telephony communication system 10 includes a network monitor 19 for monitoring various characteristics and conditions of one or more portions of the data network 20. Multiple network monitors may be present for monitoring different portions of the data network 20. The characteristics and conditions monitored include packet delay, jitter, and percentage of packet loss.

The network monitor 19 may perform monitoring of a network link in a number of different ways. One technique is to use a network monitor having two different nodes on a network link. One node of the network monitor can send test packets targeted to the other node in the network monitor 19. From the transmission and receipt (or lack of receipt) of test packets, the nodes of the network monitor 19 can determine the delays in transmissions of packets as well as the percentage of packet loss. The network monitor 19 can periodically communicate test packets to monitor the link on a periodic basis. Such a technique may be referred to as a static monitoring technique.

A dynamic technique to monitor a link is to access routers or gateways that communicate with the link. Routers and gateways maintain management information that keep track of delays being experienced with links that the routers and gateways are coupled to as well as amounts of packets that are being lost. Thus, each time a connection manager accesses a network monitor to request the current characteristics and conditions of a particular link, the network monitor can issue a query to a particular gateway or router to determine the current conditions.

Once the packet delay and loss information is determined by the connection manager 50, the connection manager 50 can access a database of models (referred to as E-models) for each connection manager to determine if a codec can satisfy' a desired level of quality based on the prevailing network link conditions. E-models may also be maintained for the other resource elements. Two E-models 350 and 352 are illustrated in FIGS. 7 and 8 for the G.729A and G.723.1 codecs, respectively. Each E-model includes a chart mapping packet delays and percentage of packet loss to a desired quality level. In each E-model chart 350 or 352, an R-value represents the desired quality of service. The connection manager 50 may maintain profiles and policies establishing the desired R-values of calls between different combinations of callers. For example, for internal calls within an organization, a lower quality of service (and therefore lower R value) may be established, whereas external calls are set at higher R values. Other embodiments may use different representations of the quality of audio service of codecs and other resource elements.

In the chart 350 for the G.729A codec, the horizontal axis represents packet delay and the vertical axis represents the R value. The curves 360A-360I represent different percentages of packet losses. In one example, the curve 360A represents a 0% packet loss, the curve 360B represents a 0.5% packet loss, the curve 360C represents a 1% packet loss, the curve 360D represents a 1.5% packet loss, the curve 360E represents a 2% packet loss, the curve 360F represents a 3% packet loss, the curve 360G represents a 4% packet loss, the curve 360H represents an 8% packet loss, and the curve 360I represents a 16% packet loss. Thus, as illustrated in FIG. 7, the higher the delay and percentage packet loss, the lower the R value. An R value of 90 generally indicates that users are very satisfied, an R value of 80 generally indicates that users are satisfied, an R value of 70 generally indicates that some users are dissatisfied, an R value of 60 generally indicates that many users are dissatisfied, and an R value of 50 and below generally indicate that nearly all users are dissatisfied with the level of service. An R value may also be used as a metric in a metric in a Service Level Agreement, as discussed earlier.

The chart 352 in FIG. 8 for the G.723.1 codec is similar to the chart 350 in FIG. 7, with the curves 362A-362I representing corresponding percentages of packet loss to curves 360A-360I in FIG. 7. Thus, given the current packet delay and percentage of packet loss, the E-models for the various codecs may be accessed to determine which codec can support the desired R value. In further embodiments, different models may be used for codec or other resource element selection.

Figure 9:
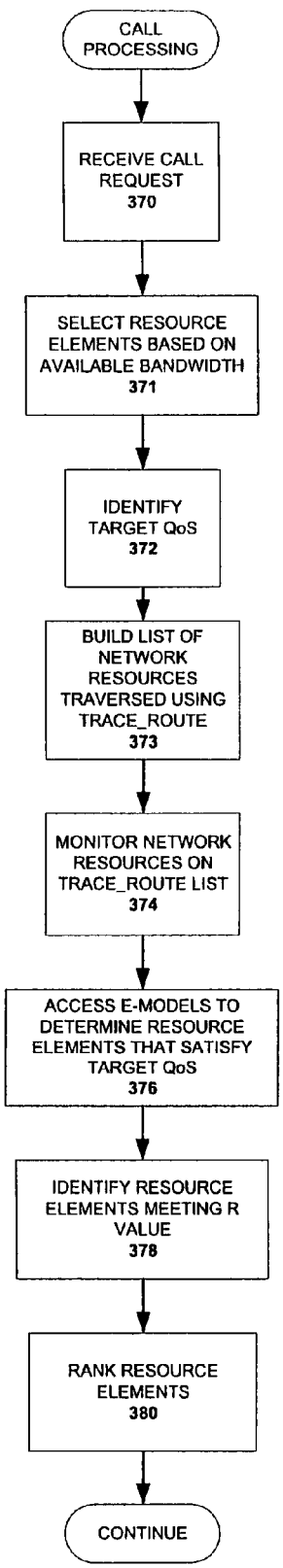
FIG. 9 illustrates a flow for processing a call request in accordance with the fourth embodiment that utilizes the E-models of FIGS. 9-10.

Thus, referring to FIG. 9, in accordance with an alternative embodiment that uses E-models, such as 350 and 352 as described previously, the connection manager 50 receives (at 370) a call request from an originating terminal. The call request may identify the resource elements, including codecs, supported by the originating terminal. The connection manager can perform (at 371) selection of the codecs and other resource elements based on the available bandwidth and usage of transmission resources, including the data network 20, as described above in connection with FIGS. 3-5. This may reduce the number of codecs and other resource elements.

Further, based on the profiles and policies associated with the identified originating and destination terminals in the call request, the connection manager identifies (at 372) the target quality of service (R value). Next, a TRACE_ROUTE signal (at 373) may be sent from the originating terminal to at least one endpoint, and then receive a list of network resources that the signal traverses from end to end. The connection manager 50 can send (at 374) query messages to the network monitor 19 to determine the current characteristics and conditions of the network resources in the list (from the trace route), including delay and packet loss. Based on the identified delay and packet loss information, the connection manager 50 accesses (at 376) the E-models of the supported codecs. From the E-models, the connection manager 50 identifies (at 378) the codecs and other resource elements that satisfy the target R value. Next, the codecs and other resources may be ranked (at 380) as described above based on various merit attributes to enable selection of one of the codecs and other resource elements to use during the call, as described above.

Some embodiments of the invention may provide one or more of the following advantages. A flexible codec (and other resource element) selection strategy is provided to enforce a policy based on the codec data rate between a pair of terminals where the codec (and other resource element) selection takes into account the capacity and resource limitation of the terminals as well as network traffic load and actual transmission resource usage in each terminal. Selection of resource elements may also be based on the prevailing characteristics and conditions of the network, such as delay and packet loss. Fine policy control over telephony traffic over a data network is made available. Selection may be biased towards high voice quality when traffic is light; however, if other network traffic high, then voice quality may be reduced to reduce the load on the data network.

The codec and other resource element selection technique and apparatus may be used with other applications. For example, for video conferencing communications sessions over a packet-based data network, selection of video codecs may also be used to reduce load on the data network.

Figure 10:
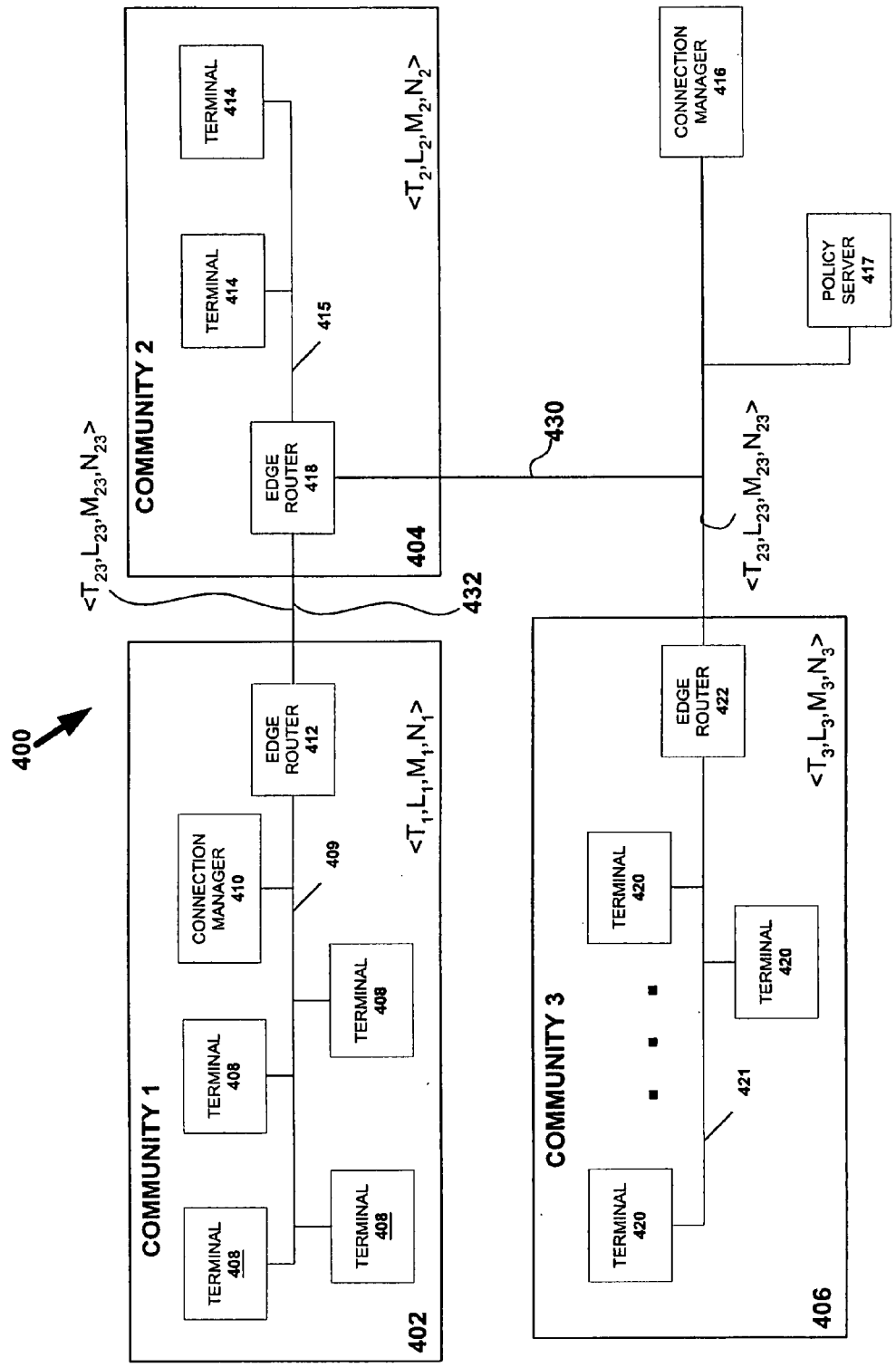
FIG. 10 illustrates a telephony communications system that includes a plurality of communities and links between the communities over which the call admission control is performed in accordance with a fifth embodiment.

Referring to FIG. 10, one arrangement of a voice communication system 400 that includes communities is illustrated. In FIG. 10, each of the three communities 402, 404, and 406 includes its set of terminals. In the community 402, terminals 408 are coupled to a link 409 (e.g., a WAN, or other network). A connection manager 410 is also coupled to the link 409 to manage calls between or among the terminals 408 and between one or more of the terminals 408 and a terminal external to the community 402. An edge router 412 couples the internal link 409 to an external link 432, which couples the first community 402 to the second community 404. In the second community 404, terminals 414 are coupled to an internal link 415. An edge router 418 is connected between the internal link 415 and the external link 432. The edge router 418 also couples the internal link 415 of the second community 404 to another external link 430. The external link 430 is coupled to a third community 406. Inside the community 406 is an edge router 422 that couples the link 430 to an internal link 421, which is connected to terminals 420. The second and third communities 404 and 406 share a connection manager 416, which manages calls within each of, or between, the communities 404 and 406 as well as between a terminal in one of the communities 404 and 406 and another community, such as community 402.

Generally, the links 430 and 432 (and other external links connecting communities) have lower bandwidths than the internal links in each of the communities. However, it is contemplated that exceptions to this exist where an external link may have higher bandwidth than an internal link. For a given community I, the following parameters may be defined: $L_I$, which represents the limit on a total bandwidth between the community and a device or system external to the community; $M_I$, which represents the threshold at which reselection of a codec, packet size, or other resource element is performed to reduce load on a link in a community; $N_I$, which represents a threshold to restrict outgoing calls, or a throughput requirement; and $T_I$, which represents the usage of the transmission resources in the community, or a throughput measurement.

Thus, outgoing new call requests from the community I may be denied if the value of $T_I$ exceeds the threshold $N_I$. If the traffic $T_I$ exceeds the threshold $M_I$, then the connection manager for the community I can start to perform codec and other resource selection to reduce traffic. As described above, a connection manager may discard codecs and/or other resource elements based on transmission resources that the connection manager monitors, including the several thresholds $L_I$, $M_I$, and $N_I$ of the community I. By example, the value of $M_I$ may be about 60% to 80% of $L_I$. The value of $N_I$ can be set at a value closer to or at $L_I$. In some embodiments, if the throughput measurement request does not meet the throughput measurement requirement, then the call may not be admitted. Optionally, if the call cannot be admitted then connection manager may iteratively discard codecs and/or other resource elements until the throughput requirement of the call request is met by the throughput measurement.

Further, a pair-wise limit can be added for call admission control between communities. In this embodiment, for a given community link between two communities I and J, the following parameters may be defined: $L_{IJ}$, which represents the limit on a total bandwidth to be used by the community link IJ for the telephony application; $M_{IJ}$, which represents the threshold at which resource element selection is performed; and $I_{IJ}$, which represents the usage of transmission resources of the community link IJ. A community link does not have an N parameter since a link has no direction and the concept of incoming or outgoing calls does not apply. These limits may be dynamic and monitored in response to throughput measurements.

In some embodiments, for a terminal in community to establish a new call with a terminal in community J, the following must be satisfied:

$$\sum_{\text{all } K} T_{IK} < L_I \text{ and } T_{IJ} < L_{IJ}$$

The first clause essentially states that the traffic between community I and all other communities must be less than the threshold limit $L_I$. Alternatively, the comparison may be made to the threshold limit $N_I$. The second clause specifies that the traffic on the link IJ between communities I and J must be less than the threshold $L_{IJ}$. If either of the two clauses are not satisfied, then the call request from a terminal in community I is denied. A threshold $M_{IJ}$ is also specified for the link IJ between communities I and J to specify a limit at which resource selection is performed.

The limits $L_I$, $L_{IJ}$, $M_I$, and $M_{IJ}$ may be static (that is, they remain fixed) or adaptive (that is, they may change with changing conditions of the data network). For example, as the data network traffic increases, the threshold values may decrease. Furthermore, the threshold values may change in response to throughput measurements. The connection manager can collect statistics regarding the network (such as by accessing a network monitor or other node such as a router or gateway) to determine the conditions of the network. The connection manager can also collect statistics from the throughput measurement response signals sent between network resources. Based on the conditions, e.g., large delays or packet losses, the threshold values may be decreased to maintain high quality of service.

As illustrated in FIG. 10, the first community 402 has the following parameters: $T_1$, $L_1$, $M_1$, $N_1$ the second community 404 has the following parameters: $T_2$, $L_2$, $M_2$, and $N_2$ and the third community 406 has the following parameters: $T_3$, $L_3$, $M_3$, and $N_3$. The community link 432 has the following parameters: $T_{12}$, $L_{12}$, $M_{12}$ and the community link 430 has the following parameters: $T_{23}$, $L_{23}$, and $M_{23}$.

Figure 11A:
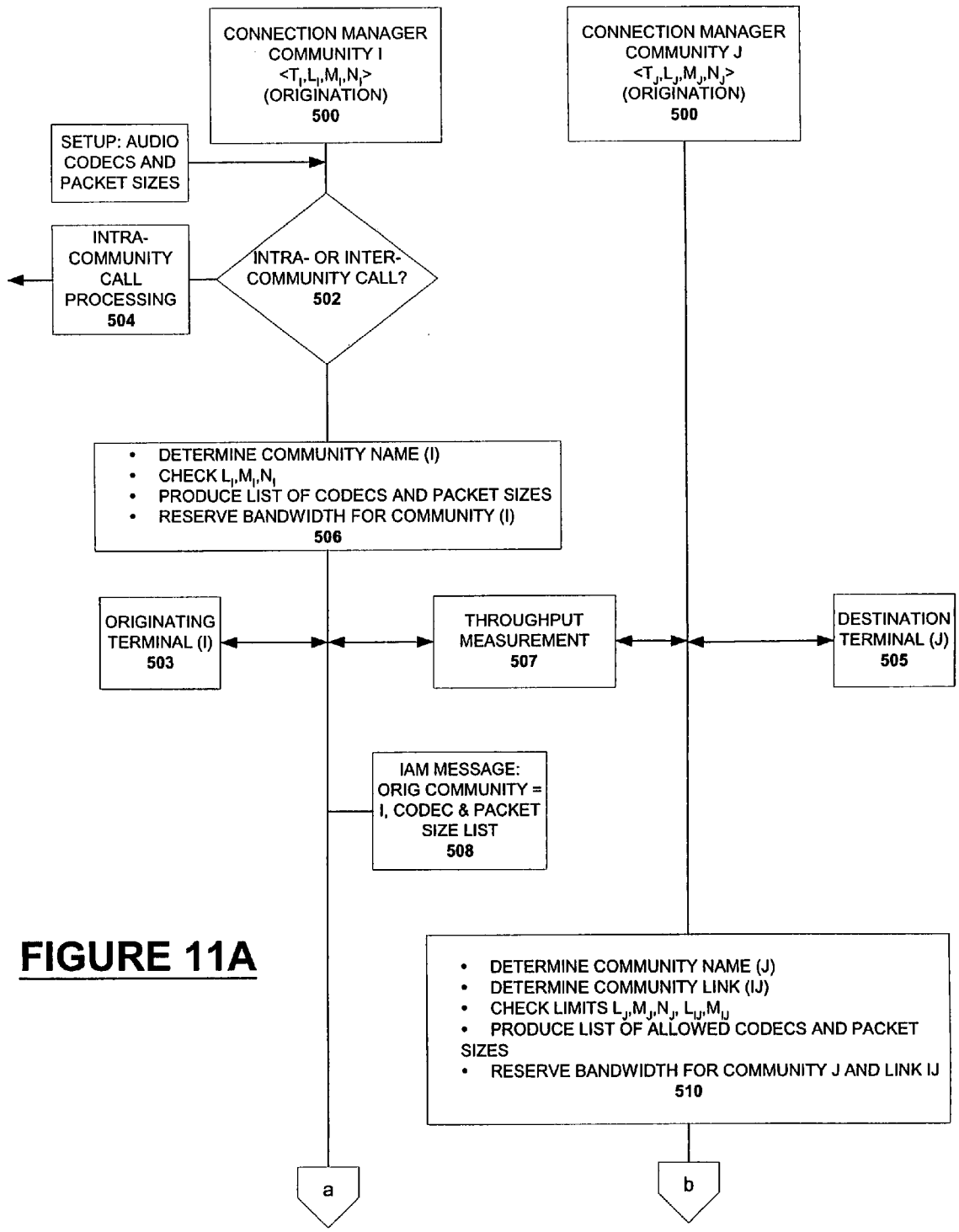
FIGS. 11A-11B illustrates the flow for managing a call request between terminals in different communities shown in FIG. 10.
Figure 11B:
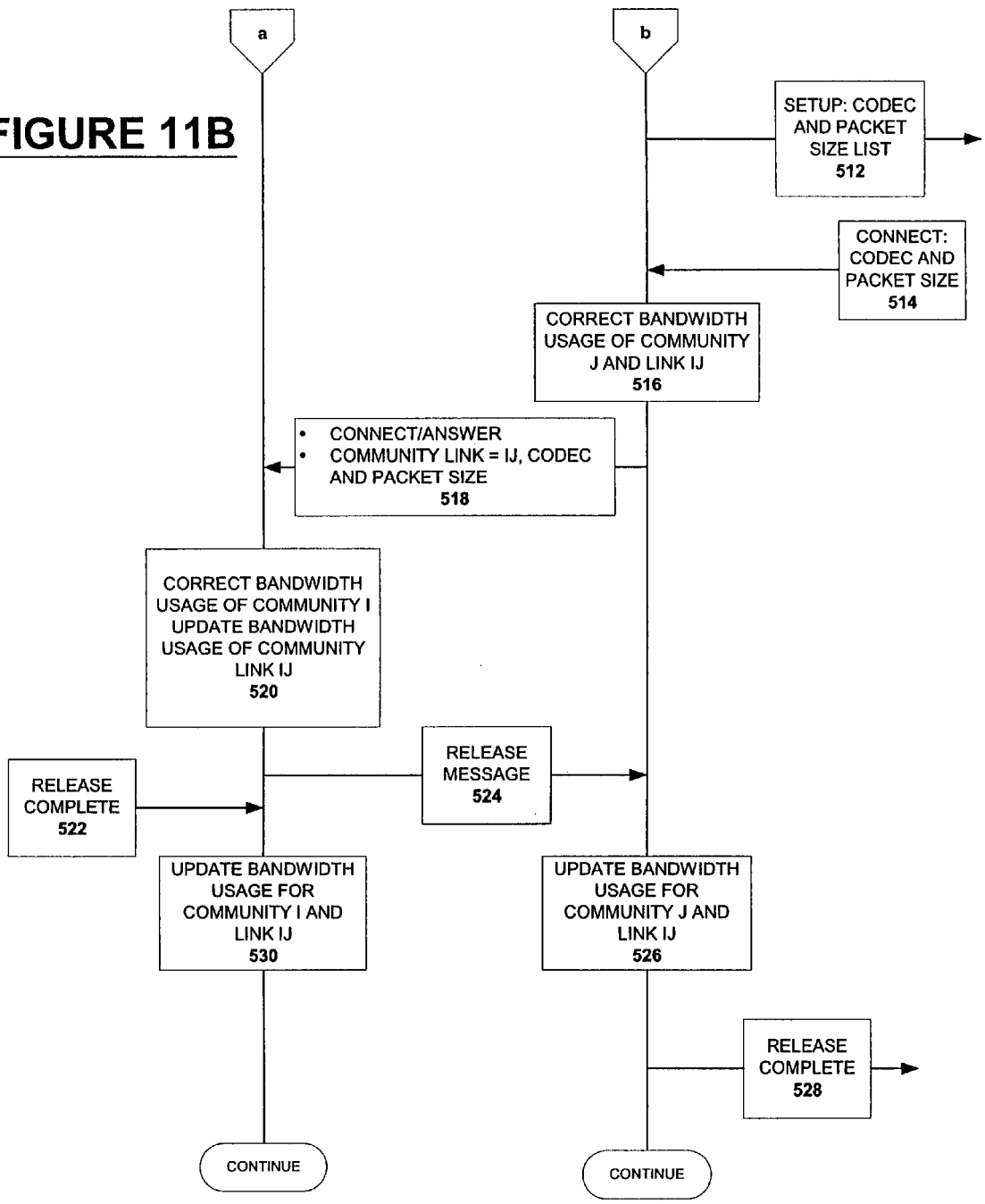

Referring to FIGS. 11A-11B, the call admissions control procedure is illustrated for a call between an originating terminal in one community (community I) and a destination terminal in a second community (community J). In the example of FIGS. 11A-11B, a first connection manager 500 services community I and a second connection manager 501 services community J. The connection manager 500 receives a CALL_SETUP message from a terminal in community I that includes a list of supported audio codecs and a list of supported packet sizes. The connection manager 500 then determines (at 502) whether the call is an intra-community or an inter-community call. If the call is an intra-community call, then the connection manager 500 in community I performs intra-community call processing and exchanges messages between the terminals involved in the call session (at 504). Codec and other resource element selection may be performed as described above if the traffic $T_I$ exceeds the threshold value $M_I$.

If the call is an inter-community call, then the connection manager 500 determines (at 506) the name of the originating community, in this case community I. The connection manager 500 then checks the attributes $L_I$, $M_I$, and $N_I$ of the community I. At this point, the connection manager 500 checks the traffic $T_{IK}$ (between community I and all other communities) against the limit $L_I$ (or $N_I$). If $T_{IK}$ exceeds $L_I$ (or $N_I$), or if the throughput measurement does not meet the throughput measurement requirement, then the call is denied by the connection manager 500. However, if the call request is allowed to proceed, then a candidate list of codecs and packet sizes is then created. Such a list of codecs and packet sizes may be further restricted based on the values of the thresholds $L_I$, $M_I$, and $N_I$. The bandwidth for community I is reserved to reserve capacity for the requested call. This allows the connection manager 500 to monitor the available bandwidth for further inter-community call requests in the community I.

A signal may be sent from connection manager 500 to the originating terminal 503 to initiate the sending of a throughput measurement (at 507) from the originating terminal 503 in community I to the destination terminal 505 in community J. The throughput measurement may comprise the trace route and monitoring combination as described in FIG. 3. Alternatively, a trace route may originate from connection manager 500, propagate via the destination terminal 505, and the originating terminal 503, and then propagate back to the connection manager 500. Optionally, RSVP signaling, as used in FIG. 5, may be used to reserve network resources on a transmission path to ensure a specific quality of service. It should be noted that step 507 may be optionally implemented at any stage in the call setup procedure.

A call request message is sent (at 508) from the connection manager 500 to the connection manager 501 that is assigned to community J. The message includes the name of the originating community I as well as the candidate list of codecs and packet sizes. In response to the message from the connection manager 500, the connection manager 501 determines the destination community name J, the community link IJ, and checks the limits $L_J$, $M_J$, and $N_J$, $L_{IJ}$ and $M_{IJ}$ (at 510). Such a check includes checking if value of $T_{IJ}$ exceeds $L_{IJ}$. Also, the value of $T_{JK}$ (total traffic of inter-community calls between community J and all other communities) is evaluated against $L_J$ (or $N_J$). If $T_{JK}$ exceeds $L_J$ (or $N_J$) or $T_{IJ}$ exceeds $L_{IJ}$, then the call is denied and the connection manager 501 informs the connection manager 500 of the call termination. The connection manager 501 may also check $T_{IJ}$ against $M_{IJ}$ and $T_{JK}$ (total traffic from community J) against $M_J$, to determine if resource selection is needed.

From the limits, the connection manager 501 may further restrict the list of allowed codecs and packet sizes. Bandwidth is then reserved for the community J and link IJ for the requested call. The connection manager 501 then sends a CALL_SETUP message (at 512) to the destination terminal in community J. The Call Setup message includes the codec and packet size candidate list. In response to the CALL_SETUP message, the destination terminal sends back a CALL_CONNECT message (at 514) that identifies a selected codec and a packet size. The connection manager 501 and destination terminal may select a codec and packet size using techniques described in connection with FIGS. 3-5, which uses a ranking algorithm. Based on the returned CALL_CONNECT message identifying the selected codec and packet size, the connection manager 501 corrects (at 516) the expected bandwidth usage of community I and link IJ. The connection manager 501 then sends back (at 518) a Connect/Answer message to the connection manager 500 that includes an identification of the community link (IJ) and the selected codec and packet size. Based on the identification of the selected codec and packet size, the expected bandwidth usage in the community I for the call session is corrected, and the expected bandwidth usage of the community link IJ is updated (at 520).

At this point, a call has been connected between the originating terminal and the destination terminal in communities I and J, respectively. If the originating terminal desires to terminate the phone call, then it sends a release message (at 522) to the connection manager 500. In response, the connection manager 501 updates (at 530) its bandwidth usage of community I and link IJ and sends a release message (at 524) to the connection manager 501. In response to the release message, the connection manager 501 updates (at 526) the bandwidth usage for community J and link IJ to reflect termination of the call. The connection manager 501 sends a release complete message (at 528) to the destination connection manager to terminate the call.

A call management method and apparatus has been described to offer call admissions control and selection of resource elements to more effectively manage usage of a data network for telephony communications while providing a higher quality of service.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of admitting calls over a network, comprising:
   receiving a call request to establish a call, the call request defining a throughput requirement and comprising an origination address for identifying an origination terminal and an identifier for identifying a destination terminal;
   transmitting a throughput measurement request in response to the received call request, the throughput measurement request causing a trace to propagate via a path between the origination terminal and the destination terminal;
   in response to the trace, receiving information identifying one or more network resources on the path between the origination terminal and the destination terminal;
   monitoring one or more performance characteristics of the one or more network resources identified to generate a throughput measurement of the path; and
   transmitting a call admission response to the origination terminal when the throughput measurement at least substantially matches the throughput requirement of the call request.

2. The method of claim 1, further comprising selecting one of the one or more network resources as a resource candidate for use in the requested call.

3. The method of claim 2, wherein the selecting one of the one or more network resources is based on the call admission response.

4. The method of claim 2, wherein the selecting one of the one or more network resources is determined by usage policy of a policy server.

5. The method of claim 1, wherein the throughput requirement relates to a perceptible quality of service.

6. The method of claim 1, wherein the throughput requirement is specified in a packet header.

7. The method of claim 1, wherein the throughput requirement complies with Resource Reservation Protocol (RSVP).

8. The method of claim 1, wherein the throughput requirement complies with Diffserv Protocol.

9. The method of claim 1, wherein the throughput requirement complies with MultiProtocol Label Switching (MPLS) Protocol.

10. The method of claim 1, wherein the call request complies with Session Initiation Protocol.

11. The method of claim 1, wherein the call request comprises a list of resource elements supported by the origination terminal, and further comprising ranking the resource elements according to a merit rating.

12. The method of claim 11, further comprising selecting a resource element according to the merit rating for use by the origination terminal.

13. The method of claim 12, wherein the selected resource element is a codes supported by the origination terminal.

14. The method of claim 1, wherein the throughput measurement request comprises at least one trace packet.

15. The method of claim 1, wherein the throughput measurement request comprises a trace route.

16. The method of claim 1, wherein the information received in response to the trace comprises one or more hops.

17. The method of claim 16, wherein the monitoring further comprises monitoring the one or more hops.

18. The method of claim 1, further comprising selecting one or more sizes of a data packet as candidates for carrying audio data in the requested call.

19. The method of claim 1, further comprising selecting an alternative path when the throughput measurement does not substantially match the throughput requirement of the call request.

20. The method of claim 19, wherein the alternative path comprises a switched telephone network.

21. The method of claim 19, wherein the alternative path comprises a dedicated communications link interconnecting network resources.

22. The method of claim 1, further comprising transmitting an alternative resource call admission response when the throughput measurement does not substantially match the throughput requirement of the call request.

23. The method of claim 1, further comprising determining a condition of the one or more network resources.

24. The method of claim 23, wherein the determining includes determining a delay in the throughput measurement in the network.

25. The method of claim 23, wherein the determining includes determining a percentage of packet loss in the network.

26. The method of claim 23, further comprising determining an expected quality of service based on the determined condition of the one or more network resources.

27. The method of claim 1, further comprising performing call admission control to accept or deny the call request.

28. The method of claim 27, wherein performing call admission control is based on usage of a link in the network.

29. The method of claim 27, wherein at least two terminals are defined in at least two communities coupled by a link in the network, and wherein performing call admission control includes performing call admission control based on a policy for the link between the communities.

30. The method of claim 29, further comprising bypassing the call admission control within at least one community.

31. The method of claim 1, wherein one of the call request, the throughput measurement request, the information received in response to the trace and the call admission response is communicated over a data bus.

32. An apparatus for admitting calls over a network, comprising:
a receiver for receiving a call request to establish a call, the call request defining a throughput requirement and comprising an origination address for identifying an origination terminal and an identifier for identifying a destination terminal;
a transmitter for transmitting a throughput measurement request in response to the received call request, the throughput measurement request causing a trace to propagate via a path between the origination terminal and the destination terminal;
a receiver for receiving, in response to the trace, information identifying one or more network resources on the path between the origination terminal and the destination terminal;
a monitor for monitoring one or more performance characteristics of the one or more network resources identified to generate a throughput measurement of the path; and
a transmitter for transmitting a call admission response to the origination terminal when the throughput measurement at least substantially matches the throughput requirement of the call request.

33. The apparatus of claim 32, further comprising a selector to select one of the one or more network resources as a resource candidate for use in the requested call.

34. The apparatus of claim 33, wherein the selector is adapted to select one of the one or more network resources based on the call admission response.

35. The apparatus of claim 33, wherein the selector is adapted to select one of the one or more network resources based on a usage policy of a policy server.

36. The apparatus of claim 32, wherein the throughput requirement relates to a perceptible quality of service.

37. The apparatus of claim 32, wherein the throughput requirement is specified in a packet header.

38. The apparatus of claim 32, wherein the throughput requirement complies with Resource Reservation Protocol (RSVP).

39. The apparatus of claim 32, wherein the throughput requirement complies with Diffserv Protocol.

40. The apparatus of claim 32, wherein the throughput requirement complies with MultiProtocol Label Switching (MPLS) Protocol.

41. The apparatus of claim 32, wherein the call request complies with Session Initiation Protocol.

42. The apparatus of claim 32, wherein the call request comprises a list of resource elements supported by the origination terminal, and the apparatus further comprises a controller adapted to rank the resource elements according to a merit rating.

43. The apparatus of claim 42, further comprising a selector to select a resource element according to the merit rating for use by the origination terminal.

44. The apparatus of claim 32, wherein the throughput measurement request comprises at least one trace packet.

45. The apparatus of claim 32, wherein the throughput measurement request comprises a trace route.

46. The apparatus of claim 32, further comprising a selector for selecting one or more sizes of a data packet as candidates for carrying audio data in the requested call.

47. The apparatus of claim 32, further comprising a selector for selecting an alternative path when the throughput measurement does not substantially match the throughput requirement of the call request.

48. The apparatus of claim 47, wherein the alternative path comprises a switched telephone network.

49. The apparatus of claim 47, wherein the alternative path comprises a dedicated communications link interconnecting network resources.

50. The apparatus of claim 32, further comprising a transmitter for transmitting an alternative resource call admission response when the throughput measurement does not substantially match the throughput requirement of the call request.

51. The apparatus of claim 32, further comprising a controller adapted to determine a condition of the one or more network resources.

52. The apparatus of claim 51, wherein the controller adapted to determine a condition of the one or more network resources is further adapted to determine a delay in the throughput measurement.

53. The apparatus of claim 51, wherein the controller adapted to determine a condition of the one or more network resources is further adapted to determine a percentage of packet loss in the network.

54. The apparatus of claim 51, wherein the controller adapted to determine a condition of the one or more network resources is further adapted to determine an expected quality of service based on the determined condition of the network resource.

55. The apparatus of claim 32, further comprising a call admission control device for accepting or denying the call request.

56. The apparatus of claim 55, wherein the call admission control device is adapted to admit the call based on usage of a link in the network.

57. The apparatus of claim 55, wherein at least two terminals are defined in at least two communities coupled by a link in the network, and wherein the call admission control device performs call admission control based on a policy for the link between the communities.

58. The apparatus of claim 57, further comprising a bypass path for bypassing the call admission control device within at least one community.

59. The apparatus of claim 32, wherein one of the call request, the throughput measurement request, the information received in response to the trace and the call admission response is communicated over a data bus.

60. The apparatus of claim 32, wherein the information received in response to the trace comprises one or more hops.

61. The apparatus of claim 60, wherein the monitor is further operable for monitoring the one or more hops.

62. A computer-readable medium containing instructions to be executed by a computer to manage calls within a telephony system, the instructions when executed causing the computer to:

receive a call request to establish a call, the call request defining a throughput requirement and comprising an origination address for identifying an origination terminal and an identifier for identifying a destination terminal;

transmit a throughput measurement request in response to the received call request, the throughput measurement request causing a trace to propagate via a path between the origination terminal and the destination terminal;

in response to the trace, receive information identifying one or more network resources on the path between the origination terminal and the destination terminal;

monitor one or more performance characteristics of the one or more network resources identified to generate a throughput measurement of the path; and transmit a call admission response to the origination terminal when the throughput measurement at least substantially matches the throughput requirement of the call request.

63. A call server comprising:

means for receiving a call request to establish a call, the call request operable for defining a throughput requirement and comprising an origination address identifying an origination terminal and an identifier for identifying a destination terminal;

means for transmitting a throughput measurement request in response to the received call request, the throughput measurement request causing a trace to propagate via a path between the origination terminal and the destination terminal;

means for receiving information identifying, in response to the trace, one or more network resources on the path between the origination terminal and the destination terminal;

monitoring one or more performance characteristics of the one or more network resources identified to generate a throughput measurement of the path; and means for transmitting a call admission response to the origination terminal when the throughput measurement at least substantially matches the throughput requirement of the call request.

* * * * *